US010833721B2

(12) United States Patent
Urzhumov

(10) Patent No.: US 10,833,721 B2
(45) Date of Patent: *Nov. 10, 2020

(54) UNIT CELL NETWORK DESIGN AND OPERATION

(71) Applicant: Elwha LLC, Bellevue, WA (US)

(72) Inventor: Yaroslav Urzhumov, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/052,152

(22) Filed: Aug. 1, 2018

(65) Prior Publication Data

US 2020/0044677 A1    Feb. 6, 2020

(51) Int. Cl.
*H04B 1/00* (2006.01)
*H04B 1/40* (2015.01)

(52) U.S. Cl.
CPC ................................ *H04B 1/40* (2013.01)

(58) Field of Classification Search
CPC ........................................................ H04B 1/40
See application file for complete search history.

(56) References Cited

U.S. PATENT DOCUMENTS

| 8,780,003 B2 | 7/2014 | Alexopoulos et al. | |
| 10,135,123 B1* | 11/2018 | Arnitz | H01Q 15/0086 |
| 2014/0044021 A1* | 2/2014 | Alberth, Jr. | H04B 1/18 370/278 |
| 2015/0375014 A1* | 12/2015 | Slayton | A61N 7/00 601/2 |
| 2016/0043751 A1* | 2/2016 | Broyde | H01Q 21/0006 455/77 |
| 2016/0204515 A1* | 7/2016 | Smith | H01Q 13/28 343/772 |
| 2017/0069969 A1* | 3/2017 | Black | H02J 50/20 |
| 2017/0214379 A1* | 7/2017 | Broyde | H03H 7/468 |
| 2018/0006374 A1* | 1/2018 | Britz | H01Q 3/44 |
| 2018/0323511 A1* | 11/2018 | Urzhumov | H01Q 1/273 |
| 2019/0089055 A1* | 3/2019 | Arnitz | H01Q 3/446 |
| 2019/0140350 A1* | 5/2019 | Urzhumov | H03H 7/20 |
| 2020/0044677 A1* | 2/2020 | Urzhumov | H01Q 15/0086 |
| 2020/0044678 A1* | 2/2020 | Urzhumov | H01Q 15/0086 |

OTHER PUBLICATIONS

PCT International Search Report; International App. No. PCT/US2019/044402; dated Nov. 18, 2019; pp. 1-4.

* cited by examiner

*Primary Examiner* — Md K Talukder

(57) ABSTRACT

In one embodiment, a signal transduction system includes an arrangement of interacting unit cells. Each unit cell can have one or more adjustable parameters that are adjustable to enable one or more adjustable impedance values of the unit cells at each of one or more operational frequencies. The interactions of the unit cells within the arrangement of the interacting unit cells can be describable with an interaction matrix that is approximately independent of the adjustable impedance values of the unit cells.

38 Claims, 13 Drawing Sheets

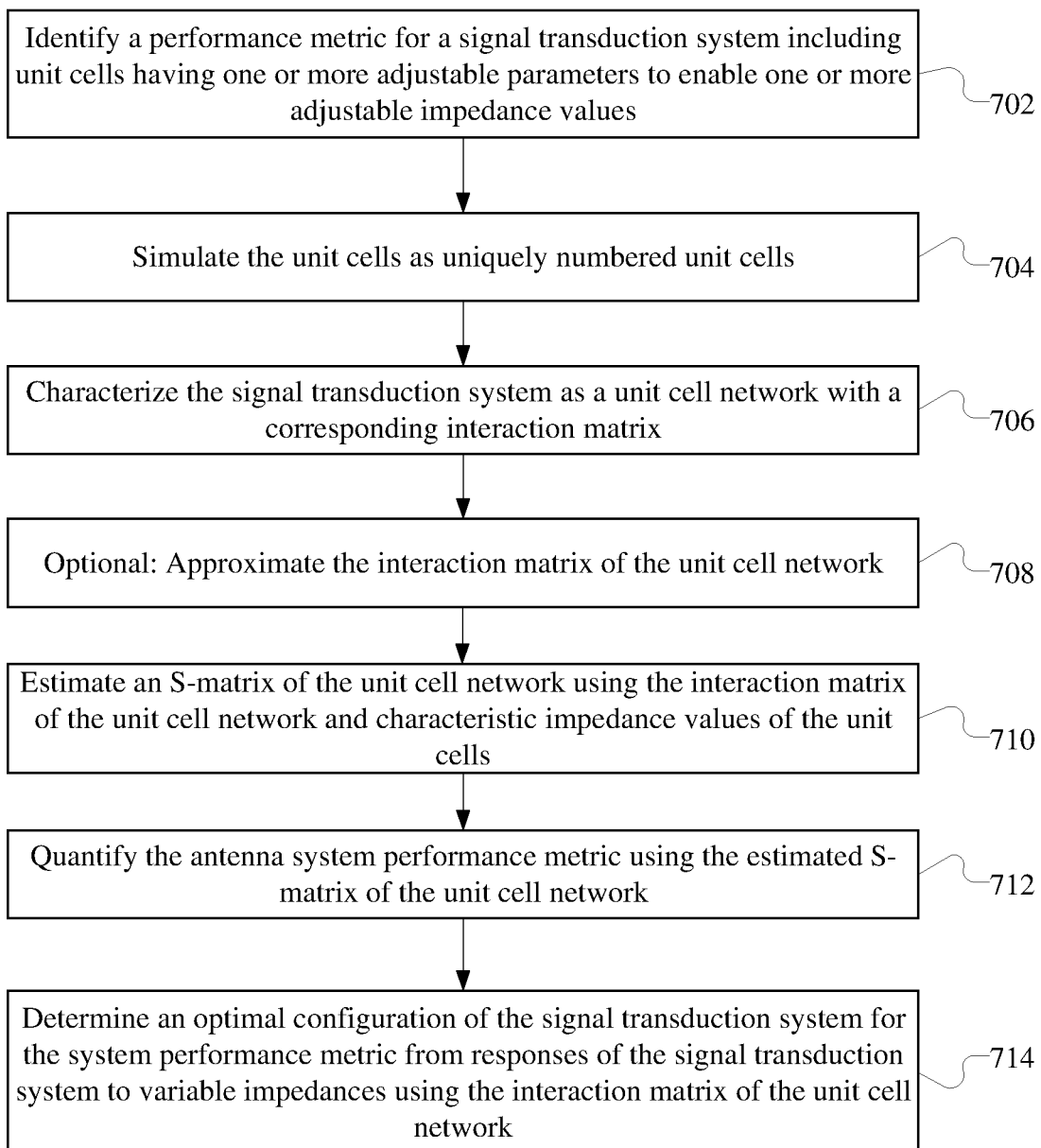

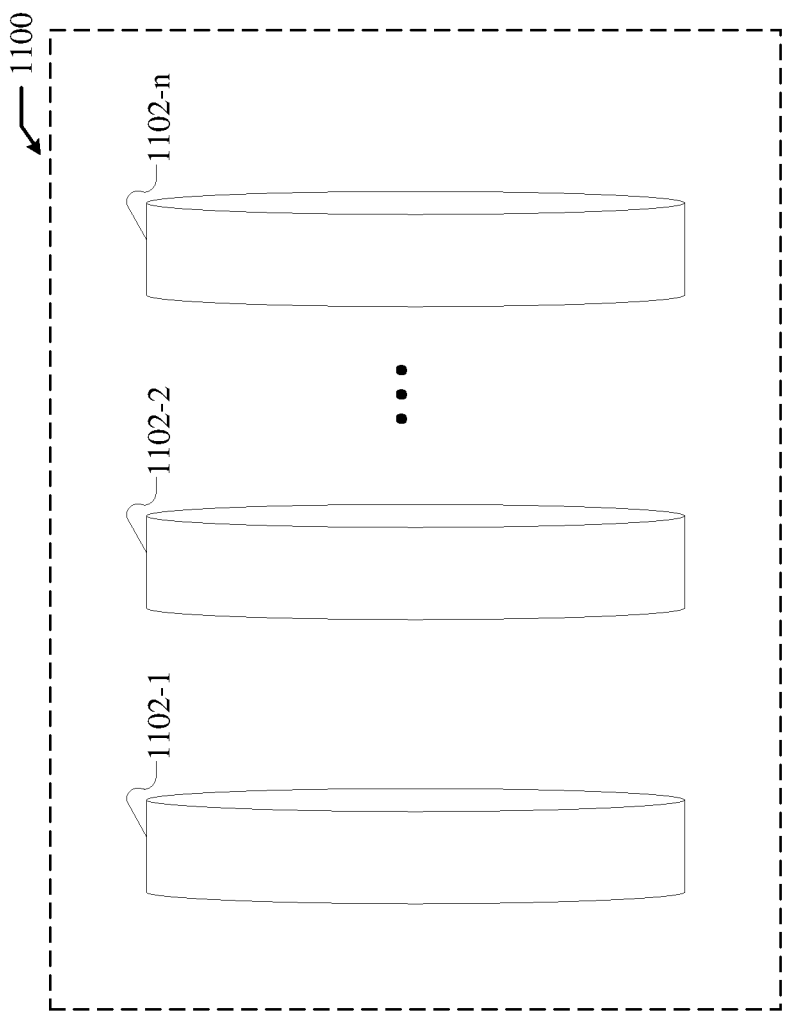
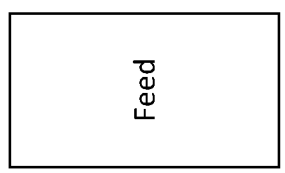
FIG. 11

UNIT CELL NETWORK DESIGN AND OPERATION

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc., applications of such applications are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

PRIORITY APPLICATIONS

None.

TECHNICAL FIELD

The present disclosure generally relates to wireless signal transmission, and more particularly, to techniques for wireless signal transmission using metamaterial transceivers.

BACKGROUND

Advances in modern technology, network connectivity, processing power, convenience, and the like, support an ever increasing number of interconnected devices such as mobile devices, cell phones, tablets, smart-cars, wearable devices, etc. In turn, these advances present new challenges and create new opportunities for network operators and third party service providers to efficiently target, communicate, or otherwise exchange signals between networked devices. Indeed, modern approaches for wireless signal transmission must often account for complex conditions and dynamic factors such as network traffic, signal propagation through various media, spectrum/frequency constraints for signal transmission, and the like.

Recently, metamaterial devices have been developed to transmit and receive signals, in particular for wireless signals. Such metamaterial devices typical employ large arrays of metamaterials that are controlled to achieve desired performance metrics during operation of the metamaterials devices. However, as sizes of arrays of metamaterials integrated into metamaterial devices grow, it becomes more and more difficult to identify or model configurations and designs of the metamaterial devices across a broad frequency range. In particular, it is difficult to design beam-forming metamaterial devices for specific applications while reducing the cost of such devices. Further, as sizes of arrays of metamaterials integrated into metamaterial devices grown, it becomes more and more difficult to control operation of the metamaterial devices according to optimized performance considerations across a broad frequency range. In particular, it is difficult to achieve fully dynamic beam-forming using metamaterial devices across a broad frequency range, e.g. the acoustic frequency range and the entire electromagnetic spectrum. There therefore exist needs for improved ways to control operation of metamaterials devices across a broad frequency range. Further, there exist needs for improved ways to design metamaterial devices for use in operation across a broad frequency range.

SUMMARY

In certain embodiments, an apparatus for transmitting or receiving signals comprises a signal transduction system. The signal transduction system includes an arrangement of interacting unit cells. Each unit cell has one or more adjustable parameters that are adjustable to enable one or more adjustable impedance values of the unit cells at each of one or more operational frequencies. The interactions of the unit cells within the arrangement of the interacting unit cells are describable with an interaction matrix that is approximately independent of the adjustable impedance values of the unit cells.

In various embodiments, a method for customizing a signal transduction system for transmitting or receiving signals comprises identifying one or more target radiation patterns of the signal transduction system for the signals. Further, one or more adjustable parameters of unit cells in an arrangement of interacting unit cells forming the signal transduction system can be adjusted according to the one or more target radiation patterns. The one or more adjustable parameters can be adjustable to enable one or more adjustable impedance values of the unit cells at each of one or more operational frequencies. The interactions of the unit cells within the arrangement of the interacting unit cells are describable with an interaction matrix that is approximately independent of the adjustable impedance values of the unit cells.

In certain embodiments, a method for manufacturing a signal transduction system for sending or receiving signals comprises selecting one or more adjustable parameters of unit cells of an arrangement of interacting unit cells of the signal transduction system. The one or more adjustable parameters can be adjustable to enable one or more adjustable impedance values of the unit cells at each of one or more operational frequencies. The interactions of the unit cells within the arrangement of the interacting unit cells are describable with an interaction matrix that is approximately independent of the adjustable impedance values of the unit cells. Further, the signal transduction system can be manufactured according to the one or more adjustable parameters of the unit cells selected for the signal transduction system.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which:

FIG. 7 is a flowchart of an example method of determining an optimal configuration of a signal transduction system for one or more signal transduction system performance metrics;

DETAILED DESCRIPTION

Figure 1:
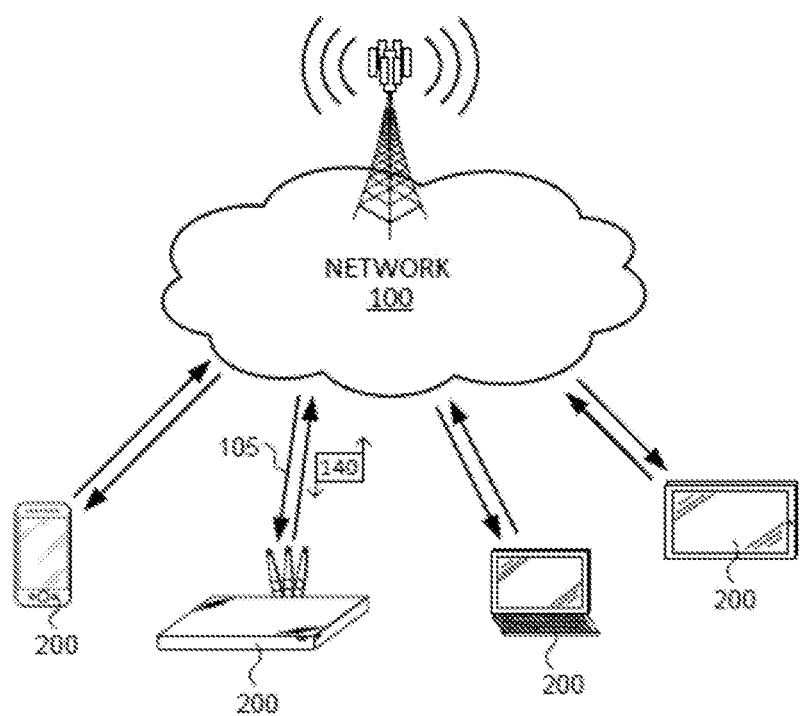
FIG. 1 illustrates a schematic block diagram of an example communication network.

The subject disclosure describes improved techniques for configuring operation of metamaterial transceivers, metamaterial devices, or other applicable tunable signal transduction systems. Specifically, the subject disclosure describes improved tunable signal transduction systems for operation across a broad frequency range, techniques for controlling tunable signal transduction systems to operate across a broad frequency range, and techniques for designing and manufacturing tunable signal transduction systems capable of operating across a broad frequency range. Further, the subject disclosure describes improved tunable signal transduction systems for providing fully dynamic beamforming across a broad frequency range, techniques for controlling tunable signal transduction systems to provide fully dynamic beamforming across a broad frequency range, and techniques for designing and manufacturing tunable signal transduction systems capable of providing fully dynamic beamforming across a broad frequency range. Notably, the techniques disclosed herein may be employed in a variety of applications such as wireless communications, heating, wireless power transmission, far field directed beams, 3D tomography, RADAR, and the like. While certain applications are discussed in greater detail herein, such discussion is for purposes of explanation, not limitation.

For example, many of the above mentioned applications can be employed in a communication network environment. In this context, a communication network is a geographically distributed collection of devices or nodes interconnected by communication links and segments for transporting data between end nodes or terminal devices, such as computers, workstations, mobile devices, sensors, and so on. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Some of the infrastructure that can be used with embodiments disclosed herein is already available, such as general-purpose computers, RF transceivers, computer programming tools and techniques, digital storage media, and communications networks. A computing device may include a processor such as a microprocessor, microcontroller, logic circuitry, or the like. The processor may include a special purpose processing device such as an ASIC, PAL, PLA, PLD, FPGA, or other customized or programmable device. The computing device may also include a computer-readable storage device such as non-volatile memory, static RAM, dynamic RAM, ROM, CD-ROM, disk, tape, magnetic, optical, flash memory, or other computer-readable storage medium.

Various aspects of certain embodiments may be implemented using hardware, software, firmware, or a combination thereof. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor need the steps be executed only once.

In certain embodiments, an apparatus for transmitting or receiving signals comprises a signal transduction system. The signal transduction system includes an arrangement of interacting unit cells. Each unit cell has one or more adjustable parameters that are adjustable to enable one or more adjustable impedance values of the unit cells at each of one or more operational frequencies. The interactions of the unit cells within the arrangement of the interacting unit cells are describable with an interaction matrix that is approximately independent of the adjustable impedance values of the unit cells.

In various embodiments, a method for customizing a signal transduction system for transmitting or receiving signals comprises identifying one or more target radiation patterns of the signal transduction system for the signals. Further, one or more adjustable parameters of unit cells in an arrangement of interacting unit cells forming the signal transduction system can be adjusted according to the one or more target radiation patterns. The one or more adjustable parameters can be adjustable to enable one or more adjustable impedance values of the unit cells at each of one or more operational frequencies. The interactions of the unit cells within the arrangement of the interacting unit cells are describable with an interaction matrix that is approximately independent of the adjustable impedance values of the unit cells.

In certain embodiments, a method for manufacturing a signal transduction system for sending or receiving signals comprises selecting one or more adjustable parameters of unit cells of an arrangement of interacting unit cells of the signal transduction system. The one or more adjustable parameters can be adjustable to enable one or more adjustable impedance values of the unit cells at each of one or more operational frequencies. The interactions of the unit cells within the arrangement of the interacting unit cells are describable with an interaction matrix that is approximately independent of the adjustable impedance values of the unit cells. Further, the signal transduction system can be manufactured according to the one or more adjustable parameters of the unit cells selected for the signal transduction system.

FIG. 1 illustrates a schematic block diagram of an example communication network 100 comprising various nodes/devices 200 (described in greater detail with respect to FIG. 2 below) interconnected by one or more links 105, which represent various methods of communication. For instance, links 105 may be wired links or shared media (e.g., wireless links, PLC links, etc.) where certain nodes 200, such as, e.g., routers, sensors, base stations, user equipment, etc., may be in communication with other nodes 200 based on distance, signal strength, current operational status, location, etc.

Signals 140 represent traffic and/or messages (e.g., data packets) sent between the devices/nodes over communication network 100 using predefined network communication protocols such as certain known wired protocols, wireless protocols (e.g., IEEE Std. 802.15.4, Wi-Fi®, Bluetooth®, etc.), PLC protocols, or other shared-media protocols where appropriate. In this context, a protocol consists of a set of rules defining how the nodes interact with each other. Moreover, signals 140 may represent wireless signals which are transmitted according to the improved beamforming techniques described herein.

Those skilled in the art will understand that any number of nodes, devices, links, etc. may be used in the computer network, and that the view shown herein is for simplicity. Also, those skilled in the art will further understand that while network 100 is shown with the nodes/devices connected to the network, such network is merely an example illustration that is not meant to limit the disclosure.

Figure 2:
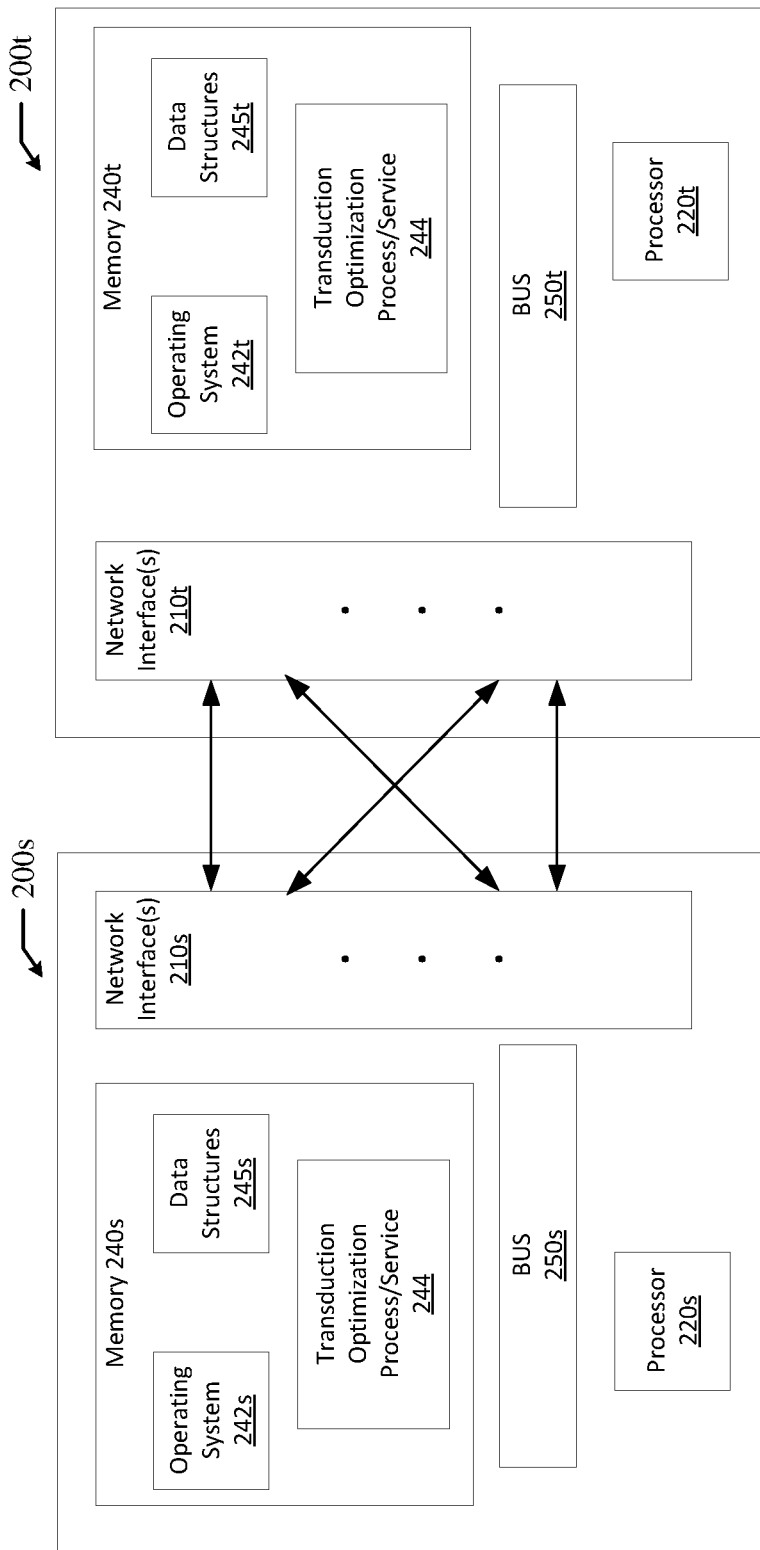
FIG. 2 illustrates a schematic block diagram of example network devices/nodes, including a source device and a target device.

FIG. 2 illustrates a schematic block diagram of example network devices/nodes that communicate over a communication network, such as communication network 100. As shown, the example network devices include a source device 200s, and a target device 200t. The source device 200s and the target device 200t can be applicable signal transduction systems for transmitting and receiving signals, such as the signal transduction systems described here. As mentioned above, although the illustrated devices are shown as configured for operations in specific environments, such devices are shown for purposes of discussion, not limitation, and further, it is appreciated the improved beamforming techniques described herein may be employed by any number of devices operating in a variety of environments, as is appreciated by those skilled in the art.

Source device 200s and target device 200t comprise similar and/or complimentary hardware/software components that support signal exchanges, e.g. over network 100. As shown, source device 200s and target device 200t includes one or more network interfaces 210s/210t, at least one processor 220s/220t, and a memory 240s/240t interconnected by a system bus 250s/250t.

Network interface(s) 210s/210t contain the mechanical, electrical, and signaling mechanisms and circuitry for communicating data, e.g. over links coupled to communication network 100. For example, network interfaces 210s/210t may be configured to transmit and/or receive data using a variety of different communication protocols, over various types of wireless communication channels, as will be discussed herein. The network interfaces 210s/210t can include a metamaterial components such as metamaterial transceivers, tunable metamaterial elements (e.g., coders), and so on. Specifically, the network interfaces 210s/210t can include one or more sub-wavelength transceiver elements with variable impedances, as will be discussed in greater detail below.

Memory 240*s*/240*t* comprises a plurality of storage locations such as data structures 245*s*/245*t*, which are addressable by processor 220*s*/220*t*. In this fashion, processor 220*s*/220*t* comprises necessary elements or logic adapted to execute the software programs and manipulate data structures 245/245*t*.

An operating system 242*s*/242*t*, portions of which are typically resident in memory 240*s*/240*t* (and executed by processor 220*s*/220*t*), functionally organizes respective devices by, inter alia, invoking operations in support of software processes and/or services executing on the device. For example, these software processes and/or services include operations to support multiple-input multiple-output (MIMO) communications, encoding/decoding symbols, spatial processing (e.g., precoding symbols, etc.), modulating, de-modulating, converting, amplifying, filtering, and so on.

In addition, memory 240*s* of source device 200*s* includes an illustrative transduction optimization process/service 244, which can be used to configure a signal transduction system, such as the source device 200*s* and/or the target device 200*t*, (e.g., transceiver, tunable metamaterial elements (e.g., coders, etc.), and other applicable tunable elements. Note that while process 244 is shown in centralized memory 240*s*, some embodiments employ process 244 over a distributed network of devices, to send and receive wireless transmissions. In particular the transduction optimization process/service 244 can configure a signal transduction system by controlling, as will be discussed in greater detail later, adjustable parameters of the signal transduction system. For example, the transduction optimization process/service 244 can identify and set impedance levels of variable impedance elements of a signal transduction system to configure the system to transmit wireless signals at a specific or otherwise desired strength level in a specific direction.

The transduction optimization process/service 244 can configure a signal transduction system to operate, as will be discussed in greater detail later, according to one or more target tuning vectors. Further, the transduction optimization process/service 244 can configure a signal transduction system to operate, as will be discussed in greater detail later, according to one or more performance metrics and corresponding optimal configurations. Performance metrics can include applicable performance metrics of a device in operating to transmit and receive wireless signals. For example, performance metrics can include metrics related to steering a transmitted wireless signal, receiving a steered wireless signal, and beamforming a transmitted wireless signal.

Source device 200*s* can determine for an array of reference points (e.g., virtual reference ports) that circumscribe at least a portion of the source device 200*s* based on reference signal amplitudes for each tuning vector. For example, the array of reference points may define a surface that circumscribes the transceiver based on a Nyquist sampling rate of one reference point per $(\lambda/2)^2$. In addition, source device 200*s* can further determine a target tuning vector, e.g. corresponding to an optimal configuration of a signal transduction system, which defines a target radiation pattern based on the field amplitudes for the array of reference points and transmits a target signal from the source device to a target device based on the target radiation pattern. In this fashion, the transduction optimization process/service 244 can facilitate beamforming signals (e.g., wireless power signals, communication signals, energy beams, etc.) for devices, e.g. devices having metamaterial components. These and other features are described in greater detail below.

Notably, various processor and memory types, including computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. For example, processor 220*s*/220*t* can include one or more programmable processors, e.g., microprocessors or microcontrollers, or fixed-logic processors. In the case of a programmable processor, any associated memory, e.g., memory 240*s*/240*t*, may be any type of tangible processor readable memory, e.g., random access, read-only, etc., that is encoded with or stores instructions that can implement program modules thereon. Processor 220*s*/220*t* can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform functions described herein.

Figure 3:
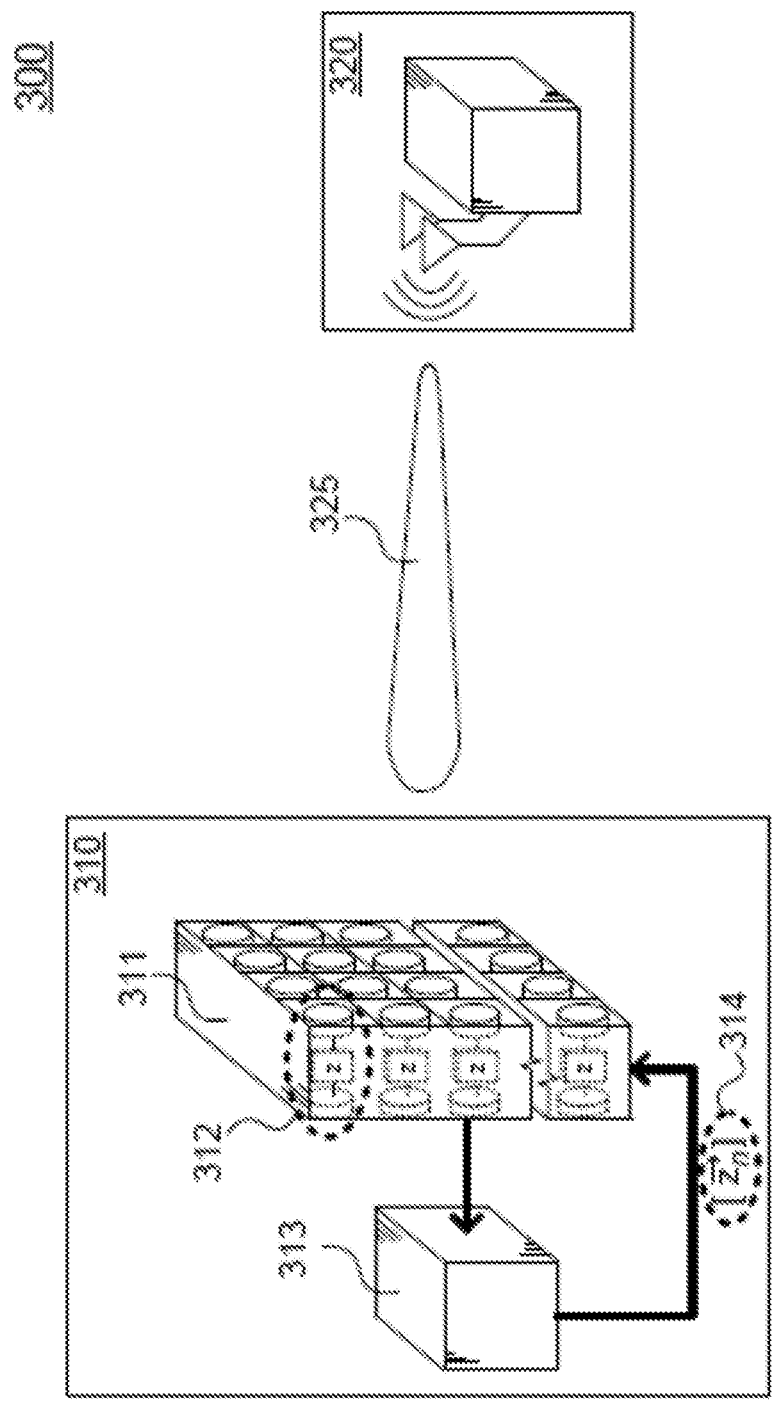
FIG. 3 illustrates a schematic block diagram of communications between a source device and a target device, showing the target device transmitting a reference signal to the source device.

FIG. 3 illustrates a schematic block diagram 300 of communications between a source device 310 and a target device 320. In the block diagram 300, a target device 320 can transmit a reference signal 325 to a source device 310 over a network such as the communication network 100 shown in FIG. 1.

Both the source device 310 and the target device 320 can include a network interface. The network interfaces can be formed through an arrangement of interacting unit cells. The unit cells can function to transmit and/or receive signals at the source device 310 and/or the target device 320. Specifically, the unit cells can transmit and/or receive waves as part of continuous wave ("CW") signals at the source device 310 and/or the target device 320. The unit cells can be formed by non-packaged elements, e.g. non-packaged electric components and/or acoustic components.

Signals received at the unit cells of the network interface of the target device 320 can be transduced, at least partially, into dc electric currents. Specifically, signal received at the target device 320 can be transduced into a dc electric current for powering the target device 320 and/or peripheral devices coupled to the target device 320. Alternatively, signals received at the unit cells of the network interface of the target device 320 can be transduced, at least partially, into heat. Still further, signals received at the unit cells of the network interface of the target device 320 can be transduced, at least partially, into acoustic waves.

The unit cells of the network interfaces of the source device 310 and the target device 320 can have one or more adjustable parameters that are adjustable to enable one or more adjustable impedance values of the unit cells. Specifically, adjustable parameters of a unit cell can be controlled or otherwise implemented to change an impedance value, e.g. either an electrical complex impedance or an acoustic complex impedance, of the unit cell from a first impedance to a second different impedance.

Interactions of unit cells forming the network interfaces of either or both the source device 310 and the target device 320 can be describable with an interaction matrix, as will be discussed in greater detail later. Specifically, interactions of the unit cells within an arrangement of the unit cells can be describable with an interaction matrix that is approximately independent of adjustable impedance values of the unit cells. More specifically, the adjustable parameters of the interactions of the unit cells can be describable with an interaction matrix that is approximately independent of the adjustable impedance values of the unit cells. For example, the adjustable parameters of the interactions of the unit cells can be describable based on static parameters, as will be discussed in greater detail later, of the unit cells regardless of actual impedance values achievable in the unit cells based on the static parameters. In another example, the adjustable parameters of the interactions of the unit cells can be describable based on dynamically adjustable parameters, as will be discussed in greater detail later, of the unit cells regardless of actual impedance values achievable in the unit cells based on the dynamically adjustable parameters.

The adjustable impedance values of the unit cells forming the network interfaces of the source device 310 and the target device 320 can correspond to a frequency-domain mode of one or more modes for each unit cell of a network of unit cells forming the network interfaces. Specifically, impedance values of the adjustable impedance values of the unit cells can correspond to an operational frequency of the unit cells. More specifically, impedance values of the adjustable impedance values of the unit cells of the source device 310 and the target device 320 can be specific to frequencies of signals that the source device 310 and the target device 320 transmit and receive.

An operational frequency of the unit cells can correspond to an applicable operational frequency for transmitting and/or receiving signals wirelessly. For example, signals transmitted and/or received at the unit cells can be electromagnetic waves, and adjustable impedance values of the unit cells can be electrical complex impedances. Further in the example, the signals can have operational frequencies in the radio frequency band, the microwave band, the millimeter band, and/or the terahertz band. Still further in the example, the signals can have operational frequencies in the infrared spectrum and/or the optical spectrum. In another example, signals transmitted and/or received at the unit cells can be acoustic waves, and adjustable impedance values of the unit cells can be acoustic impedance values. Specifically, the signals can have operational frequencies in the audible acoustic band (16 Hz-20 kHz), operational frequencies in the ultrasound acoustic band (20 kHz-100 MHz), and/or operational frequencies in the hypersound acoustic band (100 MHz-100 GHz).

The adjustable parameters of the unit cells can include static parameters of the unit cells that remain unchanged during operation of the source device 310 and the target device 320 operating as signal transduction systems. Static parameters of the unit cells can include applicable static characteristics of the unit cells that affect operating impedance values of the unit cells in the signal transduction systems. Specifically, the static parameters of the unit cells can include characteristics of the unit cells that affect operating impedance values of the unit cells at different operational frequencies of the signal transduction systems. The static parameters of the unit cells can be selected at a design stage of the signal transduction systems, e.g. before the signal transduction systems are manufactured, to adjust impedance values of the unit cells for operation in the signal transduction systems.

Static parameters of the adjustable parameters of the unit cells can include geometric parameters of the unit cells. Geometric parameters of the unit cells can include applicable physical characteristics of the unit cells that affect operating impedance values of the unit cells in the signal transduction systems. Specifically, the geometric parameters of the unit cells can include physical characteristics of the unit cells that affect operating impedance values of the unit cells at different operational frequencies of the signal transduction systems. The geometric parameters of the unit cells can be selected at a design stage of the signal transduction systems, e.g. before the signal transduction systems are manufactured, to adjust impedance values of the unit cells for operation in the signal transduction systems.

Geometric parameters of the unit cells can include characteristics of material gaps in the unit cells. For example, a geometric parameter of a unit cell can include a width of a material gap in the unit cell. In another example, a geometric parameter of a unit cell can include whether a material gap in the unit cell is a capacitive gap, e.g. when the unit cell is included as part of a signal transduction system for processing electromagnetic signals.

Further, geometric parameters of the unit cells can include characteristics of packaged components, e.g. packaged electronic components, included as part of the unit cells. For example, characteristics of packaged components included as part of the unit cells can include dimensions of packaged components in the unit cells. In another example, characteristics of packaged components included as part of the unit cells can include a width of an inductive line associated with a packaged component in a unit cell. In yet another example, characteristics of packaged components can include a width of a material in a packaged component of a unit cell. In another example, characteristics of packaged components can include a width of a capacitive gap in a packaged component of a unit cell.

Characteristics of packaged components included as part of geometric parameters of the unit cells can include either or both external or internal dimensions of one or more packaged components embedded in the unit cells. External dimensions of a packaged component can include dimensions of the entire packaged component including the packaging surrounding the component. Internal dimensions of a packaged component can include dimensions of a component contained within a package to form the packaged component. For example, external dimensions of a packaged chip can include dimensions of the packaging containing the chip, while internal dimensions of the packaged chip can include dimensions of the chip itself.

Static parameters of the adjustable parameters of the unit cells can include static electromagnetic characteristics of the unit cells. Static electromagnetic characteristics of the unit cells can include static electromagnetic characteristics of the unit cells themselves and static electromagnetic characteristics of components of the unit cells that that affect operating impedance values of the unit cells in the signal transduction systems. Specifically, the static electromagnetic characteristics of the unit cells can include static electromagnetic characteristics of the unit cells themselves and the components of the unit cells that affect operating impedance values of the unit cells at different operational frequencies of the signal transduction systems. The static electromagnetic characteristics of the unit cells can be selected at a design stage of the signal transduction systems, e.g. before the signal transduction systems are manufactured, to adjust impedance values of the unit cells for operation in the signal transduction systems.

Static electromagnetic characteristics of the unit cells can include electromagnetic characteristics of non-metallic inclusions of the unit cells. Non-metallic inclusions of the unit cells can include dielectric inclusions, liquid crystal inclusions, semiconductor inclusions, and magnetic inclusions. For example, electromagnetic characteristics of a unit cell can include an electric susceptibility of a dielectric inclusion included in the unit cell. The non-metallic inclusions of the unit cells can be integrated as part of the unit cells in background filler of the unit cells. Specifically, the non-metallic inclusions of the unit cells can be integrated as part of the unit cells in non-conductive background filler of the unit cells.

Additionally, the adjustable parameters of the unit cells can include dynamically adjustable parameters of the unit cells that are changeable during operation of the source device 310 and the target device 320 operating as signal transduction systems. Dynamically adjustable parameters of the unit cells can include applicable dynamic characteristics of the unit cells that can be controlled during operation to change operating impedance values of the unit cells in the signal transduction systems. Specifically, the static parameters of the unit cells can include characteristics of the unit cells that affect operating impedance values of the unit cells at different operational frequencies of the signal transduction systems. The static parameters of the unit cells can be selected at a design stage of the signal transduction systems, e.g. before the signal transduction systems are manufactured, to adjust impedance values of the unit cells for operation in the signal transduction systems.

Dynamically adjustable parameters of the unit cells can include variable voltage levels applied to voltage dependent elements of the unit cells. Voltage dependent elements of the unit cells include elements that use electrical power during operation of the signal transduction systems. Further, voltage dependent elements of the unit cells can include elements that have different impedance levels in response to varying voltages applied to the elements. As follows, voltages applied to the voltage dependent elements of the unit cells can be controlled to adjust impedance values of the unit cells during operation of the signal transduction systems.

Further, dynamically adjustable parameters of the unit cells can include variable electric fields applied to one or more electroactive elements of the unit cells. Electroactive elements of the unit cells can include semiconductor elements, piezoelectric elements, electroactive polymers, and liquid crystals. More specifically, electroactive elements can include elements that have different impedance levels in response to varying electric fields applied to the elements. As follows, electric fields applied to the electroactive elements can be controlled to adjust impedance values of the unit cells during operation of the signal transduction systems.

Dynamically adjustable parameters of the unit cells can include variable magnetic fields applied to the unit cells. More specifically, variable magnetic field can be applied to the unit cells to change the impedances of the unit cells as part of controlling the dynamically adjustable parameters during operation of the signal transduction systems. Further, dynamically adjustable parameters of the unit cells can include electric currents applied to magnetic-field generating elements of the unit cells. More specifically, dynamically adjustable parameters can include electric currents applies to magnetic-field generating elements interacting with magnetoactive elements of the unit cells. Magnetoactive elements include applicable elements that have properties that change in response to a varying magnetic field, e.g. acoustic metamaterials. As follows, electric fields applied to the magnetic field generating elements can be varied to change a magnetic field generated by the magnetic field generating elements. The changing magnetic field can change properties of the magnetoactive elements to ultimately adjust impedance values of the unit cells during operation of the signal transduction systems.

Additionally, dynamically adjustable parameters of the unit cells can include geometric displacements applied to the unit cells. For example, a force can be applied to a unit cell to change the geometry of the unit cell. In turn, the changing geometry of the unit cell can adjust an impedance value of the unit cell during operation of the signal transduction systems. Further, dynamically adjustable parameters of the unit cells can include dynamically adjustable geometric parameters within the unit cells that can be controlled to actually change the geometry of the unit cells. For example, a component of a unit cell can be controlled to change a width of a capacitive gap within the unit cell. As follows, the changing width of the capacitive gap within the unit cell can ultimately change an impedance value of the unit cell during operation of the signal transduction systems.

Dynamically adjustable geometric parameters within the unit cells can include operational characteristics of one or more electromechanical systems included as part of the unit cells. For example, a micro electromechanical system can be controlled to change a position of a dielectric inclusion in a unit cell. As follows, the changing position of the dielectric inclusion within the unit cell can ultimately change an impedance value of the unit cell during operation of the signal transduction systems.

The unit cells of the network interfaces can form one or more transceivers 311 for transmitting or receiving signals. The transceivers 311 can be implemented by one or more antennas, e.g. an array of antennas. The one or more transceivers 311 can comprise an array of metamaterial elements 312. Metamaterial elements 312 can be tunable two-dimensional meta-surface objects, where each metamaterial element 312 forms a unit cell. Metamaterial elements 312 can include, for example, resistors, capacitors, inductors, diodes, transistors, alternative circuit components (e.g., discrete or integrated), and the like, as is appreciated by those skilled in the art. The unit cells may be mapped and/or modeled as a unit cell "$N_a$" having respective impedance elements "z". The impedance elements of the unit cells can have different impedance values based on values of the adjustable parameters selected for the unit cells.

Moreover, metamaterial elements 312 can be passive, active, or variably passive-active and, for a given frequency, the respective impedance element z may be described by a complex value. In this fashion, a positive integer may be used to describe a portion of the tunable impedance values for the metamaterial elements 312. Alternatively, (or in addition), tunable values for respective adjustable parameters of the unit cells may be described by complex vector, [k]. Although metamaterial components 312 are represented by respective one element, it is also appreciated transceiver 311 can include a common transmission line (TL) or wave guide (not shown) coupled to one or more metamaterial components 312 via the element.

Preferably, metamaterial components 312 form sub-wavelength transceiver elements with inter-element spacing that is substantially less than a free-space wavelength for an operating frequency or frequency range of transceiver 311. For example, the inter-element spacing may be less than one-half or one-quarter of the free-space operating wavelength or frequency, which can include, as described previously, microwave frequencies, very low frequencies, low frequencies, medium frequencies, high frequencies, very high frequencies, ultra-high frequencies, super-high frequencies, extremely high frequencies, millimeter waves, optical frequencies, or acoustic frequencies.

In an example of operation with respect to the adjustable parameters of the unit cells, target device 320 transmits or radiates reference signal 325 at an arbitrary (but sufficient) power level to reach source device 310. Source device 310 receives reference signal 325 over a sequence of tuning vectors. For example, a controller 313 (e.g., a processor such as processor 220s) effectively adjusts transceiver 311 to different frequencies by adjusting parameters of the unit cells for one or more metamaterial components 312, individually or collectively using on control input(s) 314 that correspond to the adjustable parameters of the unit cells. In this fashion, controller 313 adjusts transceiver 311 to receive reference signal 325 over the sequence of tuning vectors. Put differently, target device 320 continuously transmits reference signal 325 while adjustable parameters of the source device 310 are adjusted to each tuning vector and/or the sequence of tuning vectors of control inputs 314, described in greater detail below.

Notably, adjusting may be a one-time static operation performed during the manufacturing of transceiver 311, or adjusting may be a dynamic process controlled by the one or more control inputs during operation of the signal transduction systems. Here, metamaterial components 312 can be dynamically manipulated in real-time to receive signals over a wide range of frequencies as well as to transmit or radiate signals over a wide range of radiation patterns. The number of metamaterial components 312, associated impedance elements "z", and the number of control inputs, e.g. the adjustable parameters of the unit cells, may be a 1:1:1 ratio or an X:Y:Z, where X, Y, and Z are integers that may or may not be equal. For instance, in one embodiment there may be a 1:1 mapping of impedance elements to sub-wavelength transceiver elements while there is only one-tenth the number of the control inputs.

Figure 4:
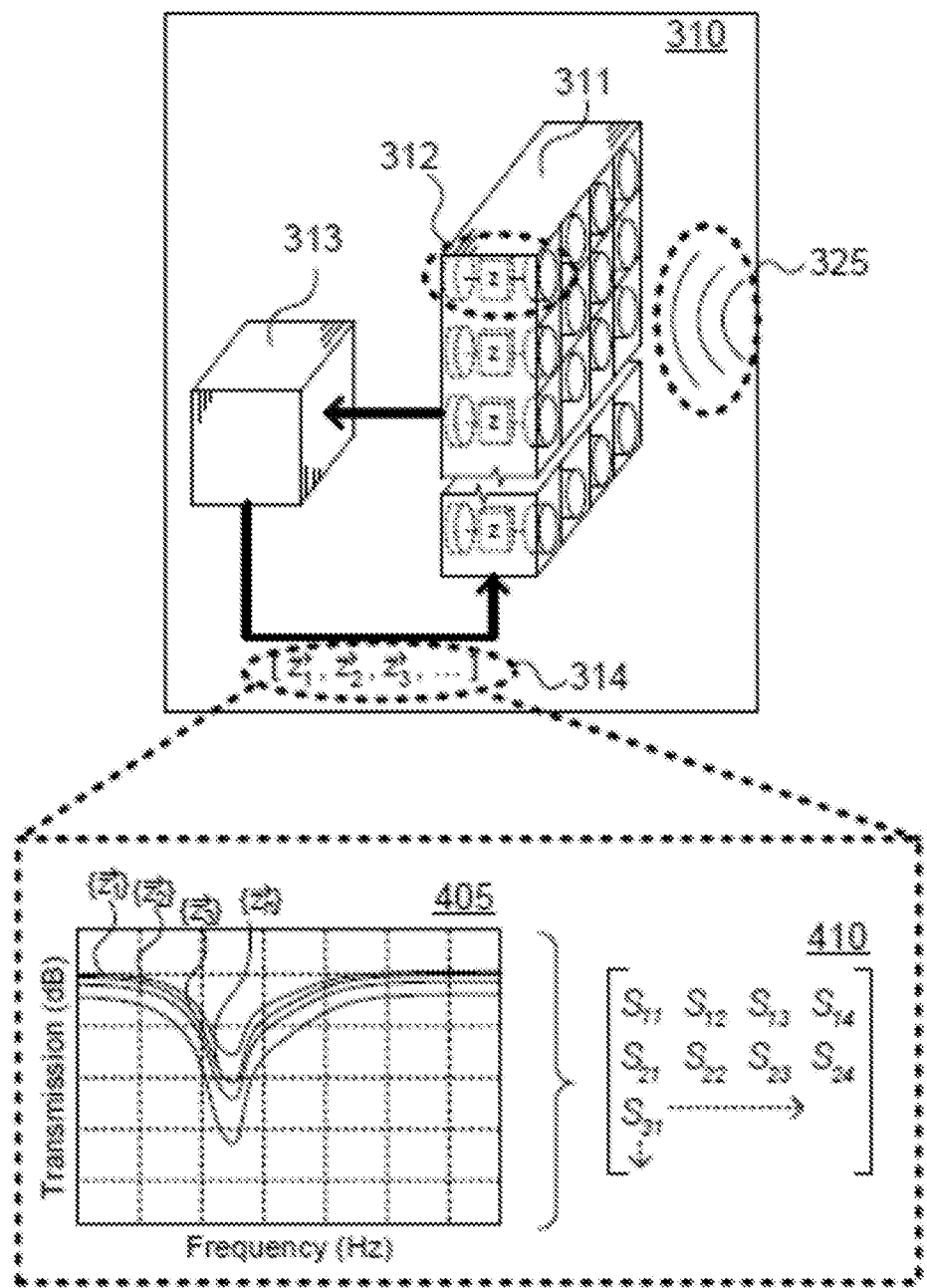
FIG. 4 illustrates a schematic block diagram of transceiver, showing metamaterial components adjusted according to one or more target tuning vectors of a signal transduction system.

FIG. 4 illustrates a schematic block diagram of transceiver 311, showing metamaterial components 312 adjusted according to one or more target tuning vectors of a signal transduction system. Specifically, the signal transduction system can be adjusted to receive reference signal 325 over the sequence of tuning vectors of control inputs 314. While FIG. 4 is discussed with reference to adjusting the transceiver 311 according to a target tuning vector, in various embodiments, as will be discussed in greater detail later, the transceiver 311 can be manufactured and/or adjusted according to an optimal configuration of a signal transduction system.

Here, source device 310 measures reference signal amplitudes for tuning vectors and for unit cells ($N_a$) mapped to respective metamaterial components 312. Specifically, the reference signal amplitudes can be measured, e.g. for corresponding tuning vectors, based on received reference signals at the signal transduction system. In turn, these field amplitudes define, at least in part, radiation patterns for received reference signals over a sequence of tuning vectors $[\vec{z}_n]$ for a frequency range. Notably, the simplest measurements may be represented by an transceiver having one input/output unit cell ($N_{i/o}=1$), with a signal amplitude measurement for each tuning vector, however it is also appreciated any the transceiver may have any number of input/output unit cells. Tuning vectors can correspond to characteristic impedance values, e.g. of unit cells based on selected adjustable parameters, which can subsequently be used to configure the signal transduction systems according to the tuning vectors. These reference signal amplitudes are represented by a signal amplitude graph 405 and can be used, in part, to estimate a corresponding scattering matrix (S-matrix) 410.

S-matrix 410 comprises scattering parameters $S_N$, which represent a complex magnitude of field (e.g., electric field) at a particular location in space, given by a radius vector $\vec{r}_0$, normalized to the field magnitude at a corresponding location in space. An absolute value $|S_N|$, or an algebraically convenient quantity $|S_{1,N}|^2$, quantifies the quality of field concentration at a given location in space (e.g., transceiver unit cells $N_a$, which are mapped to respective metamaterials components 312). Identifying the S-matrix 410 can be very difficult and consume large amounts of time and computational resources for large numbers of metamaterial components 312 forming large area arrays. Accordingly, as will be discussed in greater detail later, the S-matrix 410 can be estimated, e.g. based on the periodic or non-periodic nature of the metamaterial components 312 and corresponding unit cells, in order to reduce computational resources and time used to identify the S-matrix 410. More specifically, the S-matrix 410 can be estimated using an estimated interaction matrix that is estimated to reduce computational resources and time used to identify the interaction matrix. This, in turn, can allow for easier control and fabrication of signal transduction systems in order to meet one or more desired performance system metrics for the signal transduction systems. More specifically, signal transduction systems with large arrays of metamaterial elements can be modeled and subsequently designed and controlled under current operational and design constraints.

In operation, source device 310 adjusts transceiver 311 based on a sequence of tuning vectors $[\vec{z}_n]$, where the tuning vectors adjust impedance elements (z) according to the adjustable parameters for corresponding metamaterial components 312 and unit cells. The tuning vectors include $N_{mod}$ vectors, where each tuning vector $\vec{z}$ is defined, in part, by a length $N_{tun}$. The tuning vectors may be predefined, selected from a list of options, and/or determined dynamically based on additional measurements performed by source device 310, as is appreciated by those skilled in the art.

Source device 310 can further compute or estimate scattering or S-parameters for the S-matrix 410, based on a model of unit cells, $N_a$, of known impedance values for tuning vectors $[\vec{z}_n]$, and an interaction matrix (Y-matrix) of interaction parameters, where the Y-matrix is an equivalent inverse matrix of the Z-matrix such that $Y=Z^{-1}$.

The S-Matrix may be expressed by a relationship between the Z or Y matrices and the values of the impedance elements as follows:

$$S=(1-\sqrt{z}Y\sqrt{z})(1+\sqrt{z}Y\sqrt{z})^{-1}=(1+\sqrt{z}Y\sqrt{z})^{-1}(1-\sqrt{z}Y\sqrt{z})$$

Where "1" represents a unit matrix of size N.

Further, z can represent an adjustable impedance vector z (converted to a diagonal matrix). The adjustable impedance vector z can be a pre-determined vector function of the tuning vectors, e.g. a sample tuning vector. When the adjustable impedance vector z is a pre-determined vector function, the pre-determined vector function of the tuning vector can be pre-determined using an applicable technique. For example, the pre-determined vector function of the tuning vector can be pre-determined using a numerical model of an arrangement of the interaction unit cells in the signal transduction systems/transceivers. Alternatively, the pre-determined vector function of the tuning vector can be pre-determined using a series of numerical model of each of the interaction unit cells in the signal transduction systems/ transceivers The Y matrix can be a pre-determined interaction matrix. When the Y matrix is a pre-determined interaction matrix, the Y matrix can be pre-determined using an applicable technique. For example, the Y matrix can be pre-determined using a numerical model of the arrangement of interacting unit cells in the signal transduction systems/transceivers.

Notably, impedance values for the Z-matrix and scattering parameters for the Y-matrix are typically defined in terms of $Z_n = V_n/I_m$, where $V_n$ and $I_m$ represent a voltage at transceiver unit cell "n" and a current at unit cell "m", measured with all other unit cells open. That is, assuming unit cell currents $I_k=0$ for all k not equal to m or n. Similarly, for the Y-Matrix, $Y_{nm}=I_m/V_n$, measured with all other unit cells open. Again, that is assuming unit cell currents $I_k=0$ for all k not equal to m or n.

The S-matrix 410 can represent cell-to-cell transmission of off-diagonal elements in an N-port transceiver such as transceiver 311. In a lossless system, the S-matrix is necessarily unitary. If elements $S_n$ are singular values of the S-matrix, which are the same as the magnitudes of the eigenvalues, it can be stated that in a lossless system, all $S_n=1$. In general, if $S_{max}$ is the largest singular value, then for a passive lossy system it can be stated that $S_n \leq S_{max} \leq 1$.

In an active system, these bounds still hold, however $S_{max}$ can now exceed unity, representing an overall power gain for at least one propagation path. The Z and Y matrices are diagonal in the same basis represented by a unitary matrix:

$$U(U^\dagger = U^{-1}), \text{such that } Z=U^\dagger Z_d U, Y=U^\dagger Y_d U$$

Where "d" indicates a diagonal matrix comprising complex-valued eigenvalues.

In general, unless $\sqrt{z}$ is proportional to a unit matrix, i.e., all unit cell impedances are equal, the S-Matrix will not be diagonal in the U-basis. In the U-basis, the general form of the S-Matrix is:

$$S=U^\dagger(1-\zeta Y_d \zeta)(1+\zeta Y_d \zeta)^{-1} U$$

Where a new non-diagonal matrix $\zeta = U\sqrt{z}U^\dagger$ is used such that:

$$\sqrt{z}=U^\dagger \zeta U$$

Where $Y_d$ is diagonal (though not generally commutative with a

The S-matrix can be numerically evaluated with any desired accuracy by solving N linear system problems, e.g., $Z_{nm}=V_n/I_m$ or $Y_{nm}=I_m/V_n$, and the associated open unit cell conditions described above. Such problems may be solved with Finite Element Methods (FEM) or finite-difference time-domain (FDTD) based solvers for linear electromagnetic systems. Examples of commercially available solvers include ANSYS HFSS, COMSOL, and CST. These numerical simulations incorporate various fine effects of the near-field and far-field interactions between various parts of the system, regardless of complexity.

The values of the Z-matrix may also be mapped to scattering parameters of the S-matrix by a non-linear mapping. In some instances, this mapping may be expressible as a single- or multivariate polynomial. The polynomial may be of a relatively low order (e.g., 1-5). The S-matrix may comprise N values and the Z-matrix may comprise M values, where N and M are both integers and equal to one another, such that there is a 1:1 mapping of S-matrix values and Z-matrix values. Any of a wide variety of mapping is possible. For example, the S-matrix may comprise N values and the Z-matrix may comprise M values, where N squared is equal to M. Alternatively, there may be a 2:1 or 3:1 mapping or a 1:3 or 2:1 mapping.

Figure 5:
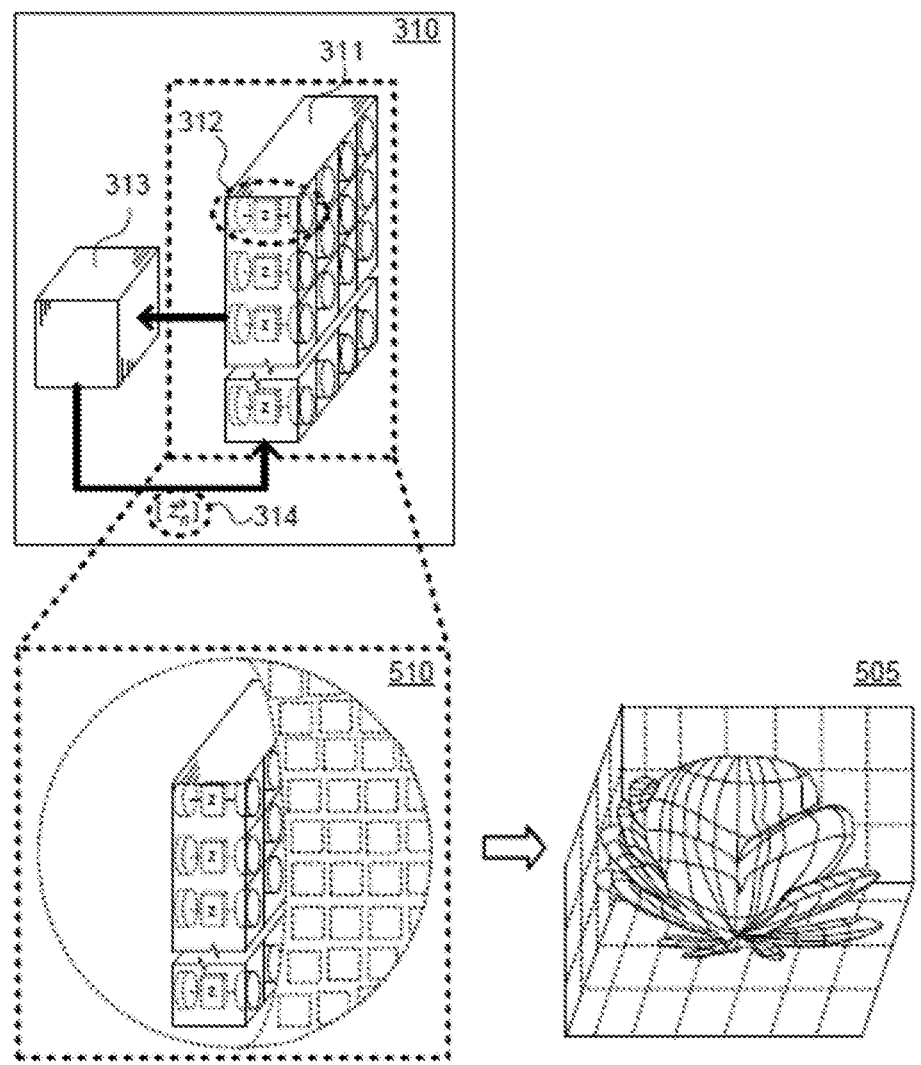
FIG. 5 illustrates a schematic block diagram of an array of reference points or virtual ports circumscribing at least a portion of the transceiver of the source device shown in FIG. 3.

FIG. 5 illustrates a schematic block diagram of an array of reference points or virtual ports 510 that circumscribe at least a portion of an transceiver 311. Here, virtual ports 510 define a surface that covers a transmission aperture of transceiver 311. As mentioned above, these virtual ports 510 can be defined and spaced about the transmission aperture based on a Nyquist sampling density of one reference point per $(\lambda/2)^2$.

Virtual ports 510 represent probes or field sampling points that can conceptually quantify field intensities (e.g., complex field amplitudes), represented by an electromagnetic field graph 505, at a particular location. Each virtual port may be assumed infinitesimal in area and/or volume and located at a particular radius-vector $\vec{r}_0$, relative to transceiver 311 and/or metamaterial components 312. Preferably, virtual ports 510 are positioned or defined at a Nyquist spatial resolution (half-wavelength) or denser and should surround or substantially surround a transmit aperture of transceiver 311 in order to provide sufficient samples for a given electromagnetic field. As discussed in greater detail herein, the field intensities can be calculated for each reference point or virtual ports 510. These field intensities can then be used to determine a desired radiating pattern for a target signal using a signal transduction system, e.g. a signal transduction system designed and/or controlled according to an optimal configuration or one or more target tuning vectors.

In operation, source device 310 can compute or estimate S-parameters based on known or approximated Z-matrix values as well as known target tuning vectors (which can correspond to characteristic impedance values of its unit cells, e.g. described through adjustable parameters.), as discussed above. For example, computing a complex field amplitude at an $i^{th}$ virtual port, which is implied to represent the field value at the corresponding reference point collocated with that virtual port, may be described by the following equation:

$$E_i = S_{i,o} * E_o$$

Where $S_{i,o}$ represents a known component of the S-matrix (computed from the known/approximated Z-matrix of the unit cells and the known values tunable vector), $E_o$ is the complex amplitude measured at an output port, and $E_i$ is the complex amplitude at the i-th virtual port, which is implied to represent the field value or field intensity at the corresponding reference point collocated with that virtual port.

Here, $E_o$ is measured, $S_{i,o}$ (S-parameters/S-matrix elements) are computed. In this fashion, the measured complex amplitudes are combined with the computed S-matrix values to yield field amplitudes at virtual ports where measurements didn't actually happen (e.g., $i^{th}$ virtual ports). In particular, the S-matric values can be defined as ratios of complex field amplitudes at different reference points, e.g. the virtual points.

The field amplitudes can be identified by simulating the signal transduction system with reference to one or more signal amplitudes provided according to a specification. Specifically, the field amplitudes can be identified by measuring the field amplitudes of the signal transduction system based on one or more signal amplitudes in a specification provided by a simulated field source. Alternatively, the field amplitudes can be identified by measuring the field amplitudes of the signal transduction system based on one or more signal amplitudes in a specification provided by a field generator.

The number of virtual ports 510 can correspond, in part, to a number of tuning vectors ($N_{mod}$). For example, if the number of virtual ports is represented by $N_{fs}$, for $N_{i/o}=1$, then $N_{mod}=N_{fs}$ or greater to ensure the number of reference points (e.g., data points) are greater than a number of unknowns to be determined ($N_{fs}$).

Here, the field amplitudes at the virtual ports correspond to an electromagnetic radiation or field pattern represented by graph 505. These field amplitudes are further used to determine a desired tuning vector for generating a target signal. That is, source device 310 adjusts transceiver 311 based on the desired tuning vector [$\vec{z}_n$] to reproduce the reference signal 325 as a target signal (e.g., a phase conjugate signal), as is appreciated by those skilled in the art.

Figure 6:
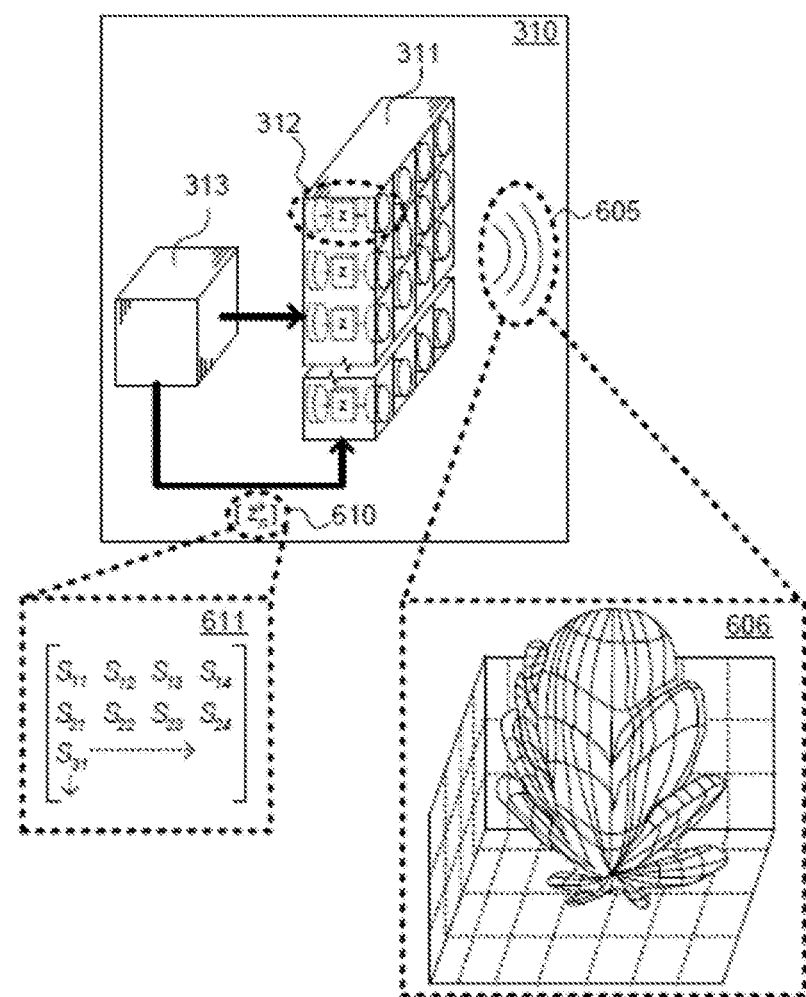
FIG. 6 illustrates a schematic block diagram of source device, showing metamaterial components of transceiver adjusted to generate a target signal 605 based on one or more target tuning vectors.

FIG. 6 illustrates a schematic block diagram of source device 310, showing metamaterial components 312 of transceiver 311 adjusted to generate a target signal 605 based on one or more target tuning vectors, e.g. corresponding to an optimal configuration of a signal transduction system, represented by control inputs 610 as well as a corresponding S-matrix 611.

As mentioned above, source device 310 determines a desired radiating pattern, e.g. for an optimal configuration—here, the radiation pattern shown in electromagnetic field graph 606—for target signal 605 based on the complex amplitudes of the fields measured at virtual ports 510. In particular, source device 310 determines a phase-conjugate of reference signal 325, resulting in target signal 605.

In order to generate target signal 605, source device 310 determines a target tuning vector or an optimized tuning vector [$\vec{z}_n$] that maximizes power at a given transceiver unit cell ($N_a$), e.g. a transceiver unit cell that is mapped to corresponding metamaterial components 312. This optimized tuning vector results in S-parameters for an S-matrix 611 that approximates the target field amplitude for each transceiver unit cell $N_a$ for a given operating frequency, e.g. a frequency in the electromagnetic spectrum or in the acoustic frequency band. For example, source device 310 may employ least-squares optimization or other techniques determine the optimal tuning vector that would lead to complex field amplitudes at the field-sampling unit cells ($N_{fs}$) being as close as possible to their desired values.

Typically, source device 310 may determine the optimal tuning vector by calculating an optimized Z-matrix using one or more of a variety of mathematical optimization techniques. For example, the optimal tuning vector may be calculated by finding an optimized Z-matrix based: on an optimization of complex impedance values $z_n$, an optimization of roots of complex values of the impedance values $z_n$, an optimization of reactances associated with the impedance values of the impedance values $z_n$, and/or an optimization of resistivities associated with the impedance values of the impedance values $z_n$. In some embodiments, optimization may be constrained to allow only positive or inductive values of reactances, or only negative or capacitive values of reactances, and/or constrained to only allow for positive or passive values of resistivities.

In addition, the optimal tuning vector, e.g. corresponding to an optimal configuration of a signal transduction system may be determined using a global optimization method involving a stochastic optimization method, a genetic optimization algorithm, a Monte-Carlo optimization method, a gradient-assisted optimization method, a simulated annealing optimization algorithm, a particle swarm optimization algorithm, a pattern search optimization method, a multistart algorithm, and/or a global search optimization algorithm. Determining the optimal tuning vector may be at least partially based on one or more initial guesses. Depending on the optimization algorithm used, the optimized values may be local optimizations based on initial guesses and may not in fact be true global optimizations. In other embodiments, sufficient optimization calculations are performed to ensure that a true globally optimized value is identified. In some embodiments, a returned optimization value or set of values may be associated with a confidence level or confidence value that the returned optimization value or set of values corresponds to global extrema as opposed to local extrema. In some embodiments, a Hessian matrix calculation may be utilized that is calculated analytically using an equation relating the S-parameter to the Z-matrix and the optimal tuning vector. In the context of optimization, the Hessian matrix may be considered a matrix of second derivatives of the scalar optimization goal function with respect to the optimization variable vector. A quasi-Newton method may also be employed in some embodiments. In some embodiments, the optimization method may include exhaustively or almost exhaustively determining local extrema by solving a multivariate polynomial equation and selecting a global extrema from the determined local extrema. Alternative gradient-based methods may be used, such as conjugate gradient (CG) methods and steepest descent methods, etc. In the context of optimization, a gradient may be a vector of derivatives of the scalar optimization goal function with respect to the vector of optimization variables. These and other methods may be used determine the optimal tuning vector, as is appreciated by those skilled in the art.

Still referring to FIG. 6, S-matrix 611 comprises elements $S_N$ that represent complex field magnitudes at transceiver unit cell $N_a$ (mapped to respective metamaterial components 312), and is given by the radius vector $\vec{r}_0$, normalized to the field magnitude at the port. An absolute value $|S_N|$, or the more algebraically convenient quantity $|S_N|^2$, quantifies the quality of field concentration at that point. Maximizing this quantity (or minimizing in the case of forming nulls) represents a generalized beamforming algorithm, as is appreciated by those skilled in the art.

For example, when there is only one i/o unit cell in the Tx, a simplified alternative algorithm can be run instead of 2d. Using reciprocity, the Tx is analyzed in receive mode. In this situation, the optimum tuning vector represents a vector that maximizes power at the i/o port, given the complex amplitudes at the field-sampling unit cells ($N_{fs}$). This is substantially simpler (single-optimization-goal) inverse problem to solve, in comparison with the multi-goal problem (or weighted sum of goals).

As mentioned, source device 310 can adjust impedance values to achieve the optimized tuning vector [$\vec{z}_n$], e.g. corresponding to an optimal configuration of a signal transduction system, using control inputs 610 corresponding to a sequence of tuning vectors. In this fashion, source device 310 adjusts transceiver 311 (and/or metamaterial components 312) to generate target signal 605. Control inputs 314 may include various types of control signals (e.g., direct current signals, alternating current signals, pulse width modulated signals, optical signals, thermal conduction signals, etc.), as is appreciated by those skilled in the art.

Further, depending on manufacturing techniques (e.g., 3D printing) values for the optimum tuning vector may translate trivially into the choices made for the selectable unit cells mapped to corresponding metamaterial elements 312. As discussed previously, the unit cells can be dynamically adjustable or otherwise variable during operation of the signal transduction systems such that there is a non-trivial relationship between the complex impedance of the unit cells and the stimuli that control them. In these embodiments, the relationship between the complex impedance of the unit cells and the control inputs may be based on a magnitude of an applied signal, as is appreciated by those skilled in the art.

FIG. 7 is a flowchart 700 of an example method of determining an optimal configuration of a signal transduction system for one or more signal transduction system performance metrics. An optimal configuration of a signal transduction system can include a configuration of a signal transduction system either before operation or during operation of the signal transduction system. Specifically, an optimal configuration of a signal transduction system can include values of adjustable parameters that are adjustable to enable one or more adjustable impedance values of unit cells of the signal transduction system, such as the adjustable parameters described herein. Further, as discussed previously, the interactions of the unit cells in operating according the adjustable parameters can be describable with an interaction matrix that is approximately independent of the adjustable impedance values of the unit cells.

The flowchart 700 begins at step 702, where a performance metric for a signal transduction system including tunable impedance elements is identified. A signal transduction system performance metric can include an applicable desirable or otherwise wanted metric for a signal transduction system to meet during operation. Specifically, a signal transduction system performance metric can include a performance metric for a signal transduction system operating to transmit a signal at a specific frequency according to a specific target radiation pattern. For example, a signal transduction system performance metric can include transmitting wireless signals at specific modulated amplitudes and phases to achieve a target radiation pattern. Further, a signal transduction system performance metric can include a performance metric for a signal transduction system operating to receive a signal, e.g. a wireless signal. For example, a signal transduction system performance metric can include a target receiving pattern for receiving wireless signals at a specific frequency range.

The signal transduction system can be an applicable signal transduction system capable of being adjusted, e.g. in operation, such as the devices shown in any of FIGS. 1-6. For example, the signal transduction system can include an array of metamaterials or sub-wavelength elements that have adjustable characteristics that allow for adjusting of the signal transduction system. More specifically, the signal transduction system can include one or more adjustable parameters, such as the adjustable parameters as described herein, for adjusting impedances of unit cells in the signal transduction system. Subsequently, impedances of the unit cells of tunable impedance elements can be adjusted to configure the signal transduction system for a specific operation, e.g. to operate according to or to meet the performance metric.

The signal transduction system can comprise a periodic arrangement of geometrically identical unit cells. A periodic arrangement of geometrically identical unit cells can correspond to an array of elements in the signal transduction system, e.g. adjustable elements in the signal transduction system. For example, each adjustable element in an array of adjustable elements can form a single unit cell of a periodic arrangement of geometrically identical unit cells formed across the array of adjustable elements. In another example, a plurality of adjustable elements in an array of adjustable elements can form a single unit cell of a periodic arrangement of geometrically identical unit cells formed across the array of adjustable elements. Each unit cell of the periodic arrangement of geometrically identical unit cells can be formed by the same number of elements of the signal transduction system at corresponding positions within the unit cell to form the unit cell. For example, each unit cell of a periodic arrangement of geometrically identical unit cells can be formed by a single adjustable element with a corresponding actual position at a center of a geometric representation of each unit cell.

A periodic arrangement of geometrically identical unit cells, included as part of the signal transduction system, can correspond to only a portion of elements of the signal transduction system. For example, only a portion of an array of adjustable elements of the signal transduction system can make up a periodic arrangement of geometrically identical unit cells. Further in the example, a remaining portion of the array of adjustable elements can form unit cells separate from the periodic arrangement of geometrically identical unit cells, e.g. forming cells that are geometrically distinct or are not in a periodic arrangement. Additionally, a periodic arrangement of geometrically identical unit cells can comprise a substantial portion of elements of a signal transduction system. Specifically, a number of elements of a plurality of elements that form a periodic arrangement of geometrically identical unit cells can be above a specific threshold number. For example, 90% of adjustable elements in the signal transduction system can correspond to or otherwise form a periodic arrangement of geometrically identical unit cells.

Figure 8A:
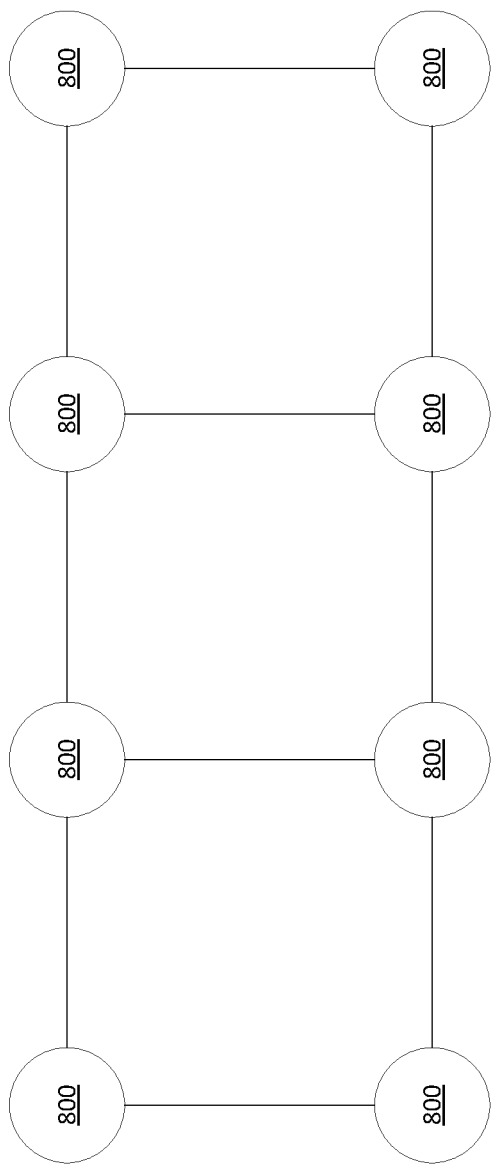
FIG. 8A illustrates a rectangular lattice pattern of unit cells.
Figure 8B:
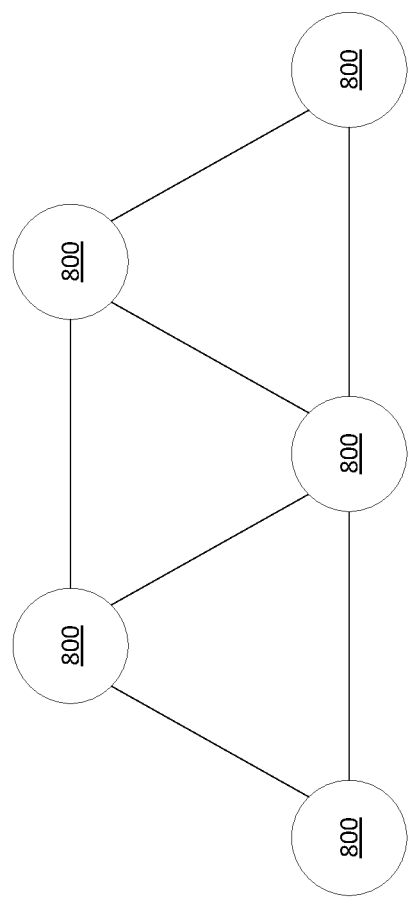
FIG. 8B illustrates a triangular lattice pattern of unit cells.
Figure 8C:
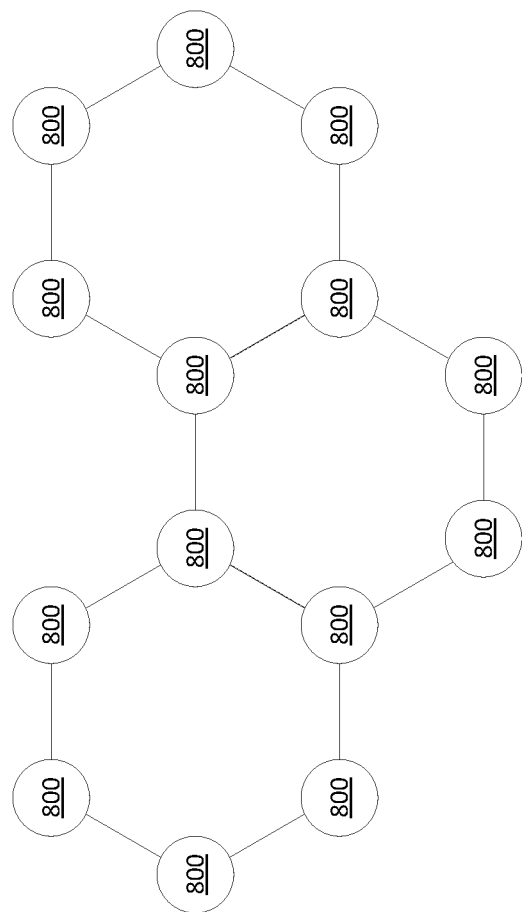
FIG. 8C illustrates a hexagonal lattice pattern of unit cells.

A periodic arrangement of geometrically identical unit cells can be periodic across one dimension. For example, a periodic arrangement of geometrically identical unit cells can include geometrically identical unit cells that are periodically repeated along a single axis or direction. Further, a periodic arrangement of geometrically identical unit cells can be periodic across two dimensions to form a two-dimensionally periodic arrangement. For example, a periodic arrangement of geometrically identical unit cells can include geometrically identical unit cells that are periodically repeated within a plane. More specifically, the unit cells, represented as circles 800 in FIGS. 8A-C which show different two-dimensionally periodic arrangements, can form a rectangular lattice, as shown in FIG. 8A, a triangular lattice, as shown in FIG. 8B, or a hexagonal lattice, as shown in FIG. 8C. Further a periodic arrangement of geometrically identical unit cells can be periodic across three dimensions to form a three-dimensionally periodic arrangement. For example, a periodic arrangement of geometrically identical unit cells can include geometrically identical unit cells that are periodically repeated within a volume of space. More specifically, unit cells can be repeated within a volume of space to form one of the three-dimensional Bravais lattices.

Alternatively, the signal transduction system can comprise a non-periodic arrangement of unit cells. Unit cells in a non-periodic arrangement of unit cells can be geometrically distinct to create the non-periodic arrangement of unit cells. Further, unit cells in a non-periodic arrangement of unit cells can be non-periodic in that the arrangement of the unit cells does not exhibit any repeated pattern. Specifically, unit cells in a non-periodic arrangement of unit cells can be non-periodic in that the geometric arrangement of the unit cells does not exhibit a repeated geometric pattern. More specifically, unit cells in a non-periodic arrangement of unit cells can be non-periodic in that the geometric arrangement of the unit cells is not periodic in a one-dimensional arrangement, a two-dimensional arrangement, and/or a three-dimension arrangement.

A non-periodic arrangement of unit cells can correspond to an array of elements in the signal transduction system, e.g. adjustable elements in the signal transduction system. For example, each adjustable element in an array of adjustable elements can form a single unit cell of a non-periodic arrangement of unit cells formed across the array of adjustable elements. In another example, a plurality of adjustable elements in an array of adjustable elements can form a single unit cell of a non-periodic arrangement of unit cells formed across the array of adjustable elements. Each unit cell of the non-periodic arrangement of unit cells can be formed by the same number of elements of the signal transduction system at corresponding positions within the unit cell to form the unit cell. For example, each unit cell of a non-periodic arrangement of unit cells can be formed by a single adjustable element with a corresponding actual position at a center of a geometric representation of each unit cell.

A non-periodic arrangement of unit cells, included as part of the signal transduction system, can correspond to only a portion of elements of the signal transduction system. For example, only a portion of an array of adjustable elements of the signal transduction system can make up a non-periodic arrangement of unit cells. Further in the example, a remaining portion of the array of adjustable elements can form unit cells separate from the non-periodic arrangement of unit cells, e.g. forming cells that are in a periodic-arrangement. Additionally, a non-periodic arrangement of unit cells can comprise a substantial portion of elements of a signal transduction system. Specifically, a number of elements of a plurality of elements that form a non-periodic arrangement of unit cells can be above a specific threshold number. For example, 90% of adjustable elements in the signal transduction system can correspond to or otherwise form a non-periodic arrangement of unit cells.

At step 704, in the flowchart 700, the unit cells are simulated as uniquely numbered unit cells. The unit cells can be uniquely numbered to a different number to allow for individual identification of each unit cell and corresponding adjustable parameters of the unit cells. The unit cells can be mapped to or modeled as uniquely numbered unit cells as part of simulating the unit cells as the uniquely numbered unit cells. More specifically, each unit cell, e.g. corresponding adjustable parameters of each unit cell, can be mapped to or modeled as a uniquely numbered unit cell as part of simulating the unit cells as uniquely numbered unit cells.

The uniquely numbered unit cells can form or otherwise correspond to unit cells in a periodic arrangement of geometrically identical unit cells of the signal transduction system. For example, a first uniquely numbered unit cell can be a first unit cell in a periodic arrangement of geometrically identical unit cells. Further in the example, one or more adjustable parameters of the uniquely numbered unit cell can be simulated, as will be discussed in greater detail later to identify adjustable impedance values of the unit cells, potentially at different operating frequencies, within the signal transduction system. More specifically, the one or more adjustable parameters of the uniquely numbered unit cell can be simulated based, at least in part, on the periodic arrangement of the unit cells to identify adjustable impedance values of the unit cells.

Additionally, uniquely numbered unit cells can form or otherwise correspond to unit cells in a non-periodic arrangement of unit cells of the signal transduction system. For example, a first uniquely numbered unit cell can be a first unit cell in a non-periodic arrangement of unit cells. Further in the example, one or more adjustable parameters of the uniquely numbered unit cell can be simulated, as will be discussed in greater detail later to identify adjustable impedance values of the unit cells, potentially at different operating frequencies, within the signal transduction system. More specifically, the one or more adjustable parameters of the uniquely numbered unit cell can be simulated based, at least in part, on the non-periodic arrangement of the unit cells to identify adjustable impedance values of the unit cells.

The unit cells can be identified or labeled, e.g. at step 704, as either a unique unit cell or a periodic unit cell. In various embodiments, all of the unit cells used to simulate the unit cells can be labeled as either a unique unit cell or a periodic unit cell. The unit cells can be identified as either unique unit cells or periodic unit cells such that all periodic unit cells belong to unit cells with identical geometry. More specifically, only unit cells that are geometrically identical can be labeled as periodic unit cells.

The unit cells can be labeled as periodic unit cells based on whether the unit cells are labeled as unique unit cells. More specifically, a portion of the unit cells can be labeled as unique unit cells and the remaining unit cells not labeled as unique unit cells can subsequently be labeled as periodic unit cells. Conversely, the unit cells can be labeled as unique unit cells based on whether the unit cells are labeled as periodic unit cells. More specifically, a portion of the unit cells can be labeled as periodic unit cells and the remaining unit cells not labeled as periodic unit cells can subsequently be labeled as unique unit cells.

The unit cells can be identified as periodic unit cells based on geometric locations of the unit cells in an array of identical unit cells. Specifically, the unit cells can be identified as periodic unit cells based on locations of the unit cells in the arrangement of unit cells of the signal transduction system. More specifically, the unit cells can be identified as periodic unit cells based on locations of adjustable elements, e.g. according to the adjustable parameters, corresponding to the unit cells in an array of adjustable elements. For example, if a unit cell includes an adjustable element in the center of an array of adjustable elements, then the unit cell can be identified as a periodic unit cell.

In identifying a unit cell as a periodic unit cell based on position in an array of unit cells, the unit cell can be identified based on characteristics of unit cells surrounding the unit cell. Specifically, a unit cell can be identified as a periodic unit cell if the unit cell is at least one interaction radius away from any unit cells in an array of unit cells that are labeled as unique unit cells. Further, a unit cell can be identified as a periodic unit cell if it is at least one interaction radius away from any unit cells in an array of unit cells that form, at least in part, an edge of the array of unit cells. An interaction radius can include an applicable size or dimension defined with respect to sizes and dimensions of unit cells within an array of unit cells. For example, an interaction radius can include three unit cell diameters of unit cells in an array of unit cells, e.g. an array of identical unit cells.

The unit cells can be identified as unique unit cells based on characteristics, e.g. physical or operational characteristics, of the unit cells. For example, the unit cells can be identified as unique unit cells based on whether the unit cells serve as physical input/output unit cells for the signal transduction system. In another example the unit cells can be identified as unique unit cells based on whether the unit cells are virtual ports. Additionally, the unit cells can be identified as unique unit cells based on their corresponding physical location, e.g. physical locations of the corresponding adjustable elements forming the unit cells. More specifically, the unit cells can be identified as unique unit cells based on locations of the unit cells with respect to array edges, e.g. edges of an array of adjustable elements of the signal transduction system, terminations, feeds, and other applicable non-periodic structures or elements in the signal transduction system.

Next, at step 706, the signal transduction system is characterized as a unit cell network with a corresponding interaction matrix. More specifically, the signal transduction system can be characterized as a unit cell network with a corresponding interaction matrix for the unit cell network comprising the unit cells simulated as uniquely numbered unit cells. As discussed above with respect to FIG. 4, a corresponding interaction matrix can represent adjustable parameters of adjustable elements of the signal transduction system, e.g. adjustable parameters of a unit cell network simulated for the adjustable elements in the array of adjustable elements. More specifically, in representing adjustable parameters of adjustable elements that are used to adjust impedance values in the unit cell network, the interaction matrix can described the unit cell network, e.g. interactions of the unit cells in the network approximately independently of the impedance values of the unit cells.

Optionally, at step 708, the interaction matrix of the unit cell network is approximated. In approximating the interaction matrix of the unit cell network, the interaction matrices can be determined without actually calculating the entire interaction matrix using applicable techniques, such as the techniques described herein. This can reduce an amount of time and computational resources used in ultimately determining an optimal configuration of the signal transduction system. Subsequently, an optimal configuration of the signal transduction system can be calculated and implemented in a more efficient manner. This is particularly important as arrays of adjustable elements, e.g. metamaterial element arrays, of signal transduction systems grow in size, thereby making optimal configuration calculation more costly in terms of both consumed time and consumed computational resources. Accordingly, approximating an interaction matrix without actually calculating the entire matrix can effectively improve functioning of a computer by allowing a computer to more efficiently identify and subsequently configure or design a signal transduction system according to an optimal configuration identified from the approximated interaction matrix.

The interaction matrix of the unit cell network can be approximated based on periodicity of the signal transduction system. In approximating the interaction matrix of the unit cell network based on periodicity of the signal transduction system, the interaction matrix of the unit cell network can be approximated based on the unit cells, simulated at step 704, and contributing to the periodicity of the unit cell network of the signal transduction system. Further, in approximating the interaction matrix of the unit cell network based on periodicity of the signal transduction system, the interaction matrices of the unit cell network can be approximated based on the adjustable elements, e.g. the adjustable parameters, corresponding to the unit cells simulated at step 704.

In approximating the interaction matrix of the unit cell network based on periodicity, the interaction matrix of the unit cell network can be approximated using a subset of the total number of unit cells identified as periodic unit cells. For example, a substantial portion of the interaction matrix, e.g. over 50% of the interaction matrix can be approximated by estimating a small subset of the portion of the interaction matrix and repeating the estimated portion throughout the substantial portion. In only having to calculate a small subset of an interaction matrix and then approximating the entire matrix based on the calculated subset, large amounts of computational resources and time are conserved, thereby leading to easier control and design of signal transduction systems.

The interaction matrix of the unit cell network can be estimated based on periodic unit cells. Specifically, at least a portion of the interaction matrix can be approximated by approximating diagonal elements of a matrix corresponding to the periodic unit cells. The diagonal elements of the matrix corresponding to the periodic unit cells can be approximated by simulating one unit cell of a plurality of periodic unit cells. More specifically, the one unit cell can be simulated with periodic boundary conditions applied to the single unit cell. Alternatively, the diagonal elements of a matrix corresponding to the periodic unit cells can be approximated by simulating periodically repeatable groups of unit cells selected from the periodic unit cells. More specifically, the periodically repeatable group of unit cells can be simulated with periodic boundary conditions applied to the periodically repeatable group of unit cells.

Diagonal elements of a matrix can be approximated by assuming diagonal elements, e.g. adjustable elements, corresponding to the periodic unit cells are equal to each other. Based on this assumption, the diagonal elements corresponding to the periodic unit cells can be estimated only once, in order to estimate the interaction matrix. Accordingly, this further saves time and computational resources to initially determine an optimal configuration that would otherwise be used to actually calculate an estimated interaction matrix or further estimate the interaction matrix.

A periodically repeatable group of unit cells used to estimate the interaction matrix can include all unit cells immediately adjacent to a selected unit cell of the periodically repeatable group of unit cells. For example, a selected unit cell can include a periodic unit cell in the center of an array of periodic unit cells. Further in the example, the periodically repeatable group of unit cells can be formed to include all unit cells adjacent to the central periodic unit cell.

Additionally, a periodically repeatable group of unit cells used to estimate the interaction matrix can include all unit cells within an interaction radius of a selected unit cell of the periodically repeatable group of unit cells. As discussed previously, an interaction radius can include an applicable size or dimension defined with respect to sizes and dimensions of unit cells within an array of unit cells. Accordingly, if a central unit cell, e.g. corresponding to a centralized unit cell, is selected, then a periodically repeatable group can be formed by all unit cells within three unit cell diameters from the centralized unit cell.

The interaction matrix of the unit cell network can be approximated based on unique numbering of the unit cells as periodic unit cells and unique unit cells. More specifically, at step 702, unit cells can be numbered based on whether they are identified as unique unit cells or periodic unit cells. For example, the unit cells identified as unique unit cells can be numbered with sequential numbers before the unit cells identified as periodic unit cells are numbered. Subsequently, the interaction matrix of the unit cell network can be formed with elements that corresponding to the unit cells based on the numbering of the unit cells according to whether the unit cells are identified as unique unit cells and periodic unit cells. Further in the example, as the unique unit cells are numbered sequentially with numbers next to each other, based on the numbering the unique unit cells can be represented in the interaction matrix within a specific area within the matrix defined according to the numbering of the unique unit cells. Still further in the example, the unique unit cells can be represented by a self-contained and self-defined area within the interaction matrix.

Further, the interaction matrix of the unit cell network can be approximated by estimating off-diagonal elements. Off-diagonal elements used to estimate the interaction matrix can include off-diagonal elements of a matrix corresponding to couplings between the periodic unit cells. Further in the example, off diagonal elements of a matrix corresponding to couplings between periodic unit cells m and n can be approximated by simulating a periodically repeatable group of unit cells including unit cells m and n. More specifically, periodic boundary conditions can be applied to the repeatable group of unit cells to ultimately approximate the interaction matrix using off-diagonal elements. As discussed previously, a periodically repeatable group of unit cells, e.g. used to estimate an interaction matrix using off-diagonal elements, can include all unit cells immediately adjacent to a selected unit cell or within an interaction radius, e.g. empirically selected interaction radius, of a unit cell.

Off-diagonal elements of a matrix can be approximated by assuming off-diagonal elements are equal to each other and therefore only estimated once. More specifically, off-diagonal elements of a matrix that correspond to couplings between elements in a geometric translation of a certain configuration, e.g. a periodic or non-periodic configuration of a signal transduction system, can be set as equal to approximate the interaction matrix. Based on this assumption, the diagonal elements corresponding to the periodic unit cells can be estimated only once, in order to estimate the interaction matrix. Accordingly, this further saves time and computational resources to determine an optimal configuration that would otherwise be used to actually calculate the interaction matrix or further estimate the interaction matrix.

Additionally, the interaction matrix can be approximated based on non-periodicity of the unit cell network. Specifically, the interaction matrix of the unit cell network can be approximated using the unit cells identified as the unique unit cells. Either or both the off-diagonal elements and diagonal elements of a matrix associated with one or more unique unit cells can be estimated to approximate the interaction matrix of the unit cell network. Further, the off-diagonal elements and diagonal elements of a matrix associated with the one or more unique unit cells can be approximated by simulating the entire unit cell network for each of the unique unit cells, e.g. the unique unit cells that make up the matrix.

At step 710, an S-matrix is estimated for the unit cell network of the signal transduction system. The S-matrix can be estimated from the approximated interaction matrix. More specifically, the S-matrix can be estimated from the interaction matrix using an applicable method of calculating an S-matrix from an interaction matrix, such as the methods described herein, e.g. as discussed previously with respect to FIG. 4. Additionally, the S-matrix can be estimated from the interaction matrix estimated for the unit cell network along with characteristic impedance values of the unit cells.

Figure 9:
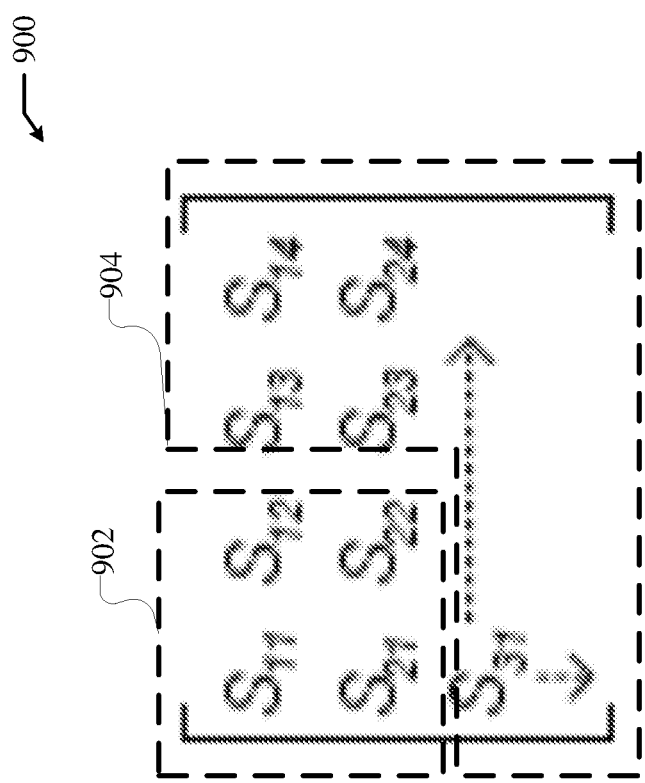
FIG. 9 illustrates an example S-matrix for use in determining an optimal configuration of the signal transduction system.

FIG. 9 shows an example S-matrix 900 for use in determining an optimal configuration of the signal transduction system. The S-matrix 900 includes a unique unit cell block 902 and a periodic unit cell block 904. As shown in FIG. 9, the unique unit cell block 902 and the periodic unit cell block 904 can both be self-contained within the S-matrix 900. Additionally, as shown in FIG. 9, the periodic unit cell block 904 and the unique unit cell block 902 can be separate from each other.

The unique unit cells of the unit cells and the periodic unit cells of the unit cells can be numbered, e.g. at step 704, to create the corresponding periodic unit cell block 904 and the unique unit cell block 902. More specifically, at either or both step 706 and 708, the interaction matrix can be characterized and subsequently approximated based on the numbering of the periodic unit cells and unique unit cells to form a corresponding periodic unit cell block region and unique unit cell block region in the interaction matrix. Subsequently, at step 710, the S-matrix with periodic unit cell block 904 and the unique unit cell block 902 can be estimated from the interaction matrix based on the corresponding periodic unit cell block region and unique unit cell block region in the interaction matrix.

At step 712, the performance metric is quantified using the estimated S-matrix of the unit cell network. The performance metric can be quantified in order to identify adjustable parameters of the signal transduction system that can be adjusted or otherwise controlled to achieve the performance metric. For example, based on the estimated S-matrix of the unit cell network, it can be identified to vary the adjustable parameters of the signal transduction system, e.g. change adjustable elements of the signal transduction system, in order to achieve the performance metric.

At step 714, an optimal configuration of the signal transduction system for the performance metric is identified. The optimal configuration of the signal transduction system can be determined for the performance metric based on responses of the signal transduction system to variable impedances, e.g. variable impedances of the unit cells of the signal transduction system. More specifically, the optimal configuration of the signal transduction system can be determined for the performance metric using either or both the interaction matrix and the S-matrix of the unit cell network, e.g. as the S-matrix is used to quantify the performance metric. The identified optimal configuration of the signal transduction system can include values of the adjustable parameters of the unit cells in the unit cell network.

Figure 10:
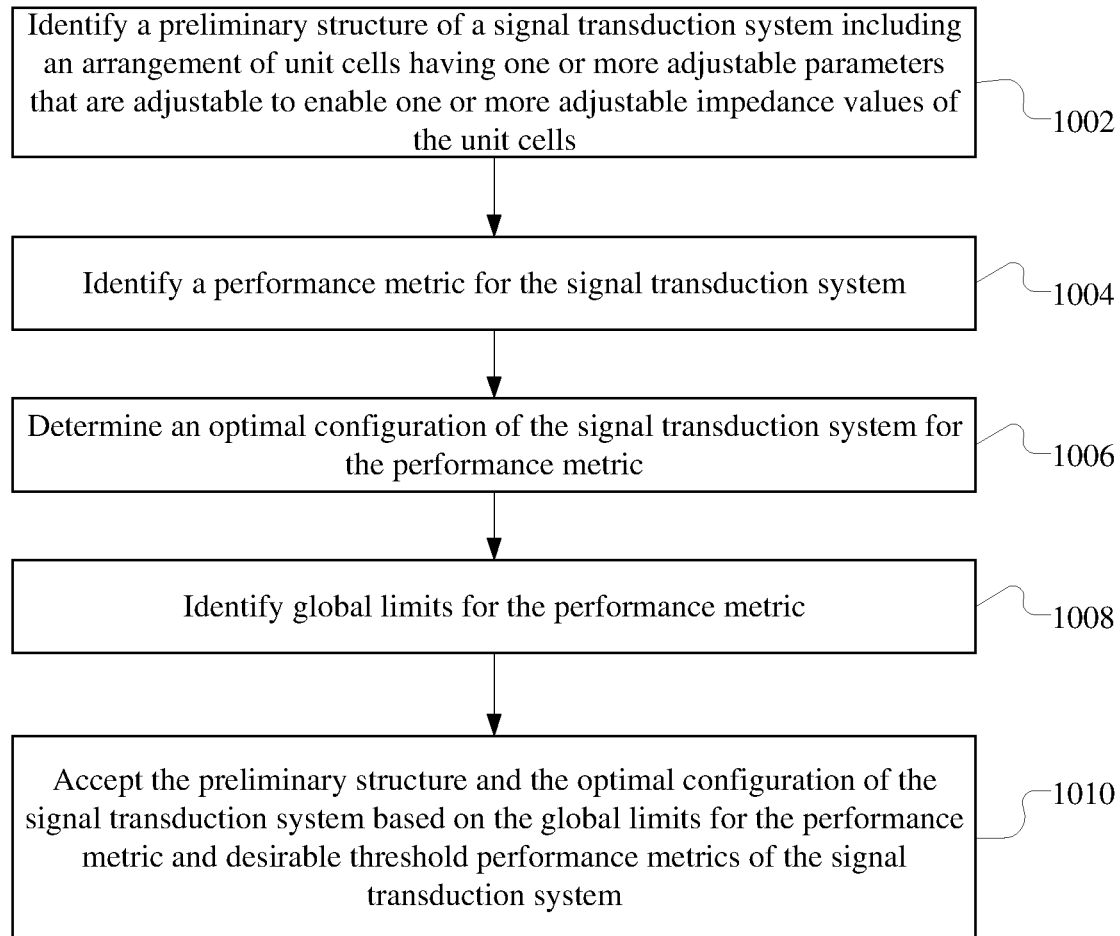
FIG. 10 is a flowchart of an example method of designing a structure of a signal transduction system to meet an transceiver system performance metric; and, FIG. 11 illustrates a schematic block diagram of a signal transduction system.

FIG. 10 is a flowchart 1000 of an example method of designing a structure of a signal transduction system to meet a performance metric. The flowchart 1000 begins at step 1002, where a preliminary structure of a signal transduction system comprising unit cells is identified. The unit cells can include one or more adjustable parameters that are adjustable to enable one or more adjustable impedance values of the unit cells at each of one or more operating frequencies of the signal transduction system. Further, as discussed previously, the interactions of the unit cells in operating according the adjustable parameters can be describable with an interaction matrix that is approximately independent of the adjustable impedance values of the unit cells.

The flowchart 1000 continues to step 1004, where a performance metric for the signal transduction system is identified. As discussed previously, the performance metric can include a desired performance metric for a signal transduction system to meet in operation.

The flowchart 1000 continues to step 1006, where an optimal configuration of the signal transduction system is determined for the performance metric. An optimal configuration of the signal transduction system can be determined for the performance metric using an applicable method of identifying an optimal configuration of a signal transduction system such as the methods described herein. More specifically, an optimal configuration of the signal transduction system can be determined using a method of identifying an optimal configuration of a tunable system using an interaction matrix, such as the method represented by the flowchart 700 shown in FIG. 7. An optimal configuration of the signal transduction system can correspond to and otherwise be determined based on the preliminary structure of the signal transduction system. For example, an optimal configuration of the signal transduction system can be determined from an impedance matrix estimated for a unit cell network modeling the preliminary structure of the signal transduction system.

The flowchart 1000 continues to step 1008, where global limits for the performance metric are identified. Global limits for the performance metric can include values of the adjustable parameters of the signal transduction system that are acceptable for still meeting the performance metric globally across one or more different signal transduction systems. For example, global limits for the performance metric can include a range of frequencies at which wireless signals can still be transmitted and/or received.

The flowchart 1000 continues to step 1010, where the preliminary structure and the optimal configuration of the signal transduction system are accepted based on the global limits for the performance metric. More specifically, the preliminary structure and the optimal configuration of the signal transduction system can be accepted if the global limits for the performance metric exceed desirable threshold performance metrics of the signal transduction system. Desirable threshold performance metrics of the signal transduction system can correspond to the preliminary structure of signal transduction system. More specifically, desirable threshold performance metrics of the signal transduction system can include performance metrics capable of being achieved by the tunable transceiver structure at the preliminary structure according to the optimal configuration of the signal transduction system.

Although not shown in flowchart 1000, if the structure and/or optimal configuration of the signal transduction system are not accepted, then the preliminary structure of the signal transduction system can subsequently be altered to identify an altered structure of the signal transduction system. For example, the adjustable parameters and/or values of the adjustable parameters of the signal transduction system can be altered if the structure and/or optimal configuration of the signal transduction system are not accepted. Subsequently, another optimal configuration of the signal transduction system can be identified with respect to the performance metric for the altered structure of the signal transduction system. Then, the altered structure of the signal transduction system and the another optimal configuration of the signal transduction system can be accepted if the global limits of the performance metric exceed desirable threshold performance metrics of the signal transduction system corresponding to the altered structure of the signal transduction system. This process can be repeated until a structure of the signal transduction system and a corresponding optimal configuration for the structure are actually accepted.

FIG. 11 illustrates a schematic block diagram of a signal transduction system 1100. The signal transduction system 1100 can function according to an applicable signal transduction system, e.g. such as the source device and the target device described here. Further, the signal transduction system 1100 can be controlled or manufactured according to an optimal configuration identified through an applicable technique, such as the techniques described here. Additionally, the signal transduction system 1100 can be controlled or manufactured according to one or more target tuning vectors identified through an applicable technique, such as the techniques described herein.

The signal transduction system 1100 includes a plurality of metamaterial layers 1102. The plurality of metamaterial layers 1102 can include a first metamaterial layer 1102-1, a second metamaterial layer 1102-2, and additional metamaterial layers 1102-$n$, e.g. a third metamaterial layer. The plurality of metamaterial layers 1102 can be formed as part of a transceiver for sending and/or receiving wireless signals. For example, the plurality of metamaterial layers 1102 can be formed as part of an applicable network interface, such as the network interfaces of the source devices and the target devices described herein.

The plurality of metamaterial layers 1102 can include or otherwise be modeled as an arrangement of interaction unit cells. The interacting unit cells of the plurality of metamaterial layers 1102 can have one or more adjustable parameters that are adjustable to enable one or more adjustable impedance values of the unit cells. Further, the interactions of the unit cells in the plurality of metamaterial layers 1102 can be describable with one or more interaction matrices that are approximately independent of the adjustable impedance values of the unit cells.

The first metamaterial layer 1102-1 can function as an illumination pattern generator. Specifically, the first metamaterial layer 1102-1 can transmit signals received from a feed as illumination patterns. More specifically, the first metamaterial layer 1102-1 can transmit signals received from the feed as selected illumination patterns by adjusting the adjustable parameters of unit cells included as part of the first metamaterial layer 1102-1. Further, the first metamaterial layer 1102-1 can move, e.g. rotate about an axis. In moving about the axis, the first metamaterial layer 1102-1 can rotate a beam pattern, e.g. a beam pattern of an illumination pattern transmitted by the first metamaterial layer 1102-1, about the axis.

The second metamaterial layer 1102-2 can be a beam-forming multiholographic medium configured to transmit a 3D field distribution based on reconstruction beams received from the first metamaterial layer as illumination parameters. Specifically, the first metamaterial layer 1102-1 can produce a 3D field distribution with different 2D slices that act as different hologram reconstruction beams incident upon the second metamaterial layer 1102-2. In turn, the second metamaterial layer 1102-2 can transmit output beams based on one or a combination of the 2D slices that act as different received hologram reconstruction beams and/or the adjustable parameters of the second metamaterial layer 1102-2.

The second metamaterial layer 1102-2 can use a plurality of different holograms to create an output beam pattern. Specifically, the second material layer 1102-2 can use a plurality of different holograms that are retrievable using different hologram reconstruction beam patterns created by the first metamaterial layer 1102-1. For example, the first metamaterial layer 1102-1 can be configured to create a specific reconstruction beam pattern that is incident upon the second metamaterial layer 1102-2 to cause the second metamaterial layer 1102-2 to create a specific output beam pattern, e.g. retrieve a specific hologram. The holograms can be stored at the second metamaterial layer 1102-2 as different holograms to allow for selective output beam pattern creation.

Further, the second metamaterial layer 1102-2 can be displaced with respect to the first metamaterial layer 1102-1. Specifically, the second metamaterial layer 1102-2 can be displaced with respect to the first metamaterial layer 1102-1 to create different hologram reconstruction beams incident upon the second metamaterial layer 1102-2. For example, the second metamaterial layer 1102-2 can be displaced with respect to the first metamaterial layer 1102-1 to achieve different 2D slices of a 3D field distribution generated by the first metamaterial layer 1102-1 at the second metamaterial layer 1102-2. The second metamaterial layer 1102-2 can be rotated with respect to the first metamaterial layer 1102-1 as part of displacing the second metamaterial layer 1102-2 with respect to the first metamaterial layer 1102-1. For example, the second metamaterial layer 1102-2 can be displaced by rotating the layer 1102-2 or translating the layer 1102-2 along a direction with respect to the first metamaterial layer 1102-1.

In various embodiments, the plurality of layers can also include a third metamaterial layer, e.g. metamaterial layer 1102-$n$. When a third metamaterial layer is used, the first metamaterial layer 1102-1 and the second metamaterial layer 1102-2 can collectively comprise an illumination pattern generator. Further, the third metamaterial layer can function as a beamforming multi-holographic medium. Specifically, all three metamaterial layers can comprise a multi-holographic medium. The third metamaterial layer can be displaced relative to the first metamaterial layer 1102-1 and the second metamaterial layer 1102-2 to transmit and/or receive signals, e.g. beamform transmitted signals.

The techniques described herein, therefore, can provide efficient techniques for sending and receiving signals wirelessly across a broad range of frequencies. Further, the techniques described herein, therefore, can provide efficient techniques for beamforming signals, e.g. with metamaterial transceiver components, across a wide range of frequencies. These techniques particularly leverage reciprocity (time invariance) of electromagnetic propagation channels that are not "polluted" by non-time-invariant components (such as EM nonlinearities and DC magnetic field generators) using tunable metamaterial components on a source device to provide unique and flexible advantages over traditional signal transmission techniques (e.g., full channel-sounding algorithms present in MIMO systems, etc.). Importantly, these techniques can be employed by a single source device where the target device only needs to periodically (or on demand) transmit a reference signal.

While there have been shown and described illustrative embodiments that provide for beamforming signals between source and target devices, it is to be understood that various other adaptations and modifications may be made within the spirit and scope of the embodiments herein. For example, the embodiments have been shown and described herein with relation specific tunable metamaterial configurations/components on the source device. However, the embodiments in their broader sense are not as limited to such configurations/components, and may, in fact, be used with any number of devices and similar configurations, as is appreciated by those skilled in the art. Accordingly, it is appreciated the features, structures, and operations associated with one embodiment may be applicable to or combined with the features, structures, or operations described in conjunction with another embodiment of this disclosure. Additionally, in many instances, well-known structures, materials, or operations are not shown or described in detail to avoid obscuring aspects of this disclosure.

Those having skill in the art will appreciate that many changes may be made to the details of the above-described embodiments without departing from the underlying principles of the invention. The scope of the present invention should, therefore, be determined only by the following claims.

What is claimed is:

1. An apparatus for transmitting or receiving signals comprising:
a signal transduction system including an arrangement of interacting unit cells, wherein each unit cell has one or more adjustable parameters that are adjustable to enable one or more adjustable impedance values of the unit cells at each of one or more operational frequencies, wherein the interactions of the unit cells within the arrangement of the interacting unit cells are characterized by an interaction matrix that is independent of the adjustable impedance values of the unit cells and further wherein the signal transduction system is operable at one or more specific configurations defined by one or more values of the one or more adjustable parameters selected based on the interaction matrix and one or more target tuning vectors.

2. The apparatus of claim 1, wherein each impedance value of the one or more adjustable impedance values corresponds to a frequency-domain mode of one or more modes for each unit cell of the unit cells at one of the one or more operational frequencies.

3. The apparatus of claim 2, wherein the signals comprise electromagnetic waves and the adjustable impedance values are electrical complex impedances.

4. The apparatus of claim 2, wherein the signals comprise acoustic waves and the adjustable impedance values are acoustic complex impedances.

5. The apparatus of claim 1, wherein the one or more adjustable parameters are selectable at a design stage to adjust the one or more adjustable impedance values of the unit cells.

6. The apparatus of claim 5, wherein the one or more adjustable parameters include one or more geometric parameters of the unit cells and the one or more geometric parameters are selected at the design stage to adjust the one or more adjustable impedance values of the unit cells.

7. The apparatus of claim 5, wherein the one or more adjustable parameters include one or more electromagnetic characteristics of non-metallic inclusions of the unit cells and the one or more characteristics of the non-metallic inclusions of the unit cells are selected at the design stage to adjust the one or more adjustable impedance values of the unit cells.

8. The apparatus of claim 1, wherein the one or more adjustable parameters are dynamically adjustable to adjust the one or more adjustable impedance values of the unit cells.

9. The apparatus of claim 1, wherein the signal transduction system includes a plurality of metamaterial layers including a first metamaterial layer and a second metamaterial layer.

10. The apparatus of claim 9, wherein the plurality of metamaterial layers is rotated around an axis to rotate a beam pattern of the signal transduction system around the axis.

11. The apparatus of claim 9, wherein the first metamaterial layer is an illumination pattern generator and the second metamaterial layer is a beamforming multi-holographic medium.

12. The apparatus of claim 11, wherein the first metamaterial layer produces a 3D field distribution with different 2D slices that act as different hologram reconstruction beams incident upon the second metamaterial layer.

13. The apparatus of claim 9, wherein the plurality of metamaterial layers further comprises a third metamaterial layer.

14. The apparatus of claim 13, wherein the first and the second metamaterial layers collectively comprise an illumination pattern generator and the third metamaterial layer is a beamforming multi-holographic medium.

15. A method of customizing a signal transduction system for transmitting or receiving signals comprising:
 identifying one or more target radiation patterns of the signal transduction system for the signals, wherein the signal transduction system includes an arrangement of interacting unit cells with one or more adjustable parameters that are adjustable to enable one or more adjustable impedance values of the unit cells at each of one or more operational frequencies; and
 adjusting the one or more adjustable parameters according to the one or more target radiation patterns to enable one or more specific configurations defined by one or more values of the one or more adjustable parameters based on one or more target tuning vectors and an interaction matrix that is independent of the adjustable impedance values of the unit cells and characterizes the interactions of the unit cells within the arrangement of the interacting unit cells.

16. The method of claim 15, wherein each impedance value of the one or more adjustable impedance values corresponds to a frequency-domain mode of one or more modes for each unit cell of the unit cells at one of the one or more operational frequencies.

17. The method of claim 16, wherein the signals comprise electromagnetic waves and the adjustable impedance values are electrical complex impedances.

18. The method of claim 16, wherein the signals comprise acoustic waves and the adjustable impedance values are acoustic complex impedances.

19. The method of claim 15, wherein the one or more adjustable parameters are selectable at a design stage to adjust the one or more adjustable impedance values of the unit cells.

20. The method of claim 19, wherein the one or more adjustable parameters include one or more geometric parameters of the unit cells and the one or more geometric parameters are selected at the design stage to adjust the one or more adjustable impedance values of the unit cells.

21. The method of claim 19, wherein the one or more adjustable parameters include one or more electromagnetic characteristics of non-metallic inclusions of the unit cells and the one or more characteristics of the non-metallic inclusions of the unit cells are selected at the design stage to adjust the one or more adjustable impedance values of the unit cells.

22. The method of claim 15, wherein the one or more adjustable parameters are dynamically adjustable to adjust the one or more adjustable impedance values of the unit cells.

23. The method of claim 15, wherein the one or more adjustable parameters include one or more electric fields applied to the one or more electroactive elements of the unit cells and the one or more electric fields are dynamically adjusted to adjust the one or more adjustable impedance values of the unit cells, and wherein the signal transduction system includes a plurality of metamaterial layers including a first metamaterial layer and a second metamaterial layer.

24. The method of claim 23, wherein the plurality of metamaterial layers is rotated around an axis to rotate a beam pattern of the signal transduction system around the axis.

25. The method of claim 23, wherein the first metamaterial layer is an illumination pattern generator and the second metamaterial layer is a beamforming multi-holographic medium.

26. The method of claim 25, wherein the first metamaterial layer produces a 3D field distribution with different 2D slices that act as different hologram reconstruction beams incident upon the second metamaterial layer.

27. The method of claim 23, wherein the plurality of metamaterial layers further comprises a third metamaterial layer.

28. The method of claim 27, wherein the first and the second metamaterial layers collectively comprise an illumination pattern generator and the third metamaterial layer is a beamforming multi-holographic medium.

29. A method of manufacturing a signal transduction system for sending or receiving signals comprising:
 selecting one or more adjustable parameters of unit cells of an arrangement of interacting unit cells of the signal transduction system, wherein the one or more adjustable parameters are adjustable to enable one or more adjustable impedance values of the unit cells at each of one or more operational frequencies, and the interactions of the unit cells within the arrangement of the interacting unit cells are characterized by an interaction matrix that is independent of the adjustable impedance values of the unit cells; and
 manufacturing the signal transduction system according to the one or more adjustable parameters of the unit cells selected for the signal transduction system, wherein the signal transduction system is operable at one or more specific configurations defined by one or more values of the one or more adjustable parameters selected based on the interaction matrix and one or more target tuning vectors.

30. The method of claim 29, wherein each impedance value of the one or more adjustable impedance values corresponds to a frequency-domain mode of one or more modes for each unit cell of the unit cells at one of the one or more operational frequencies.

31. The method of claim 30, wherein the signals comprise electromagnetic waves and the adjustable impedance values are electrical complex impedances.

32. The method of claim 30, wherein the signals comprise acoustic waves and the adjustable impedance values are acoustic impedances.

33. The method of claim 29, wherein the one or more adjustable parameters are selectable at a design stage to adjust the one or more adjustable impedance values of the unit cells.

34. The method of claim 33, wherein the one or more adjustable parameters include one or more geometric parameters of the unit cells and the one or more geometric parameters are selected at the design stage to adjust the one or more adjustable impedance values of the unit cells.

35. The method of claim 33, wherein the one or more adjustable parameters include one or more electromagnetic characteristics of non-metallic inclusions of the unit cells and the one or more characteristics of the non-metallic inclusions of the unit cells are selected at the design stage to adjust the one or more adjustable impedance values of the unit cells.

36. The method of claim 29, wherein the one or more adjustable parameters are dynamically adjustable to adjust the one or more adjustable impedance values of the unit cells.

37. The method of claim 29, wherein the signal transduction system includes a plurality of metamaterial layers including a first metamaterial layer and a second metamaterial layer, and wherein the plurality of metamaterial layers further comprises a third metamaterial layer.

38. The method of claim 37, wherein the first and the second metamaterial layers collectively comprise an illumination pattern generator and the third metamaterial layer is a beamforming multi-holographic medium.

* * * * *